(12) United States Patent
Shintani et al.

(10) Patent No.: US 12,034,524 B2
(45) Date of Patent: Jul. 9, 2024

(54) EMERGENCY ALERT MESSAGE DETECTION ON ELECTRONIC DEVICE BASED ON AUDIO-VIDEO INFORMATION

(71) Applicant: SONY GROUP CORPORATION, Tokyo (JP)

(72) Inventors: Peter Shintani, San Diego, CA (US); Adam Goldberg, Fairfax, VA (US); Loren Pineda, San Diego, CA (US)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/735,725

(22) Filed: May 3, 2022

(65) Prior Publication Data

US 2023/0361898 A1    Nov. 9, 2023

(51) Int. Cl.
| | |
|---|---|
| H04H 20/59 | (2008.01) |
| G06N 20/00 | (2019.01) |
| H04H 60/70 | (2008.01) |
| H04N 21/81 | (2011.01) |

(52) U.S. Cl.
CPC ............. *H04H 20/59* (2013.01); *G06N 20/00* (2019.01); *H04H 60/70* (2013.01); *H04N 21/814* (2013.01)

(58) Field of Classification Search
CPC ...... H04H 20/59; H04H 60/70; H04H 21/814; G06N 20/00
See application file for complete search history.

(56) References Cited

U.S. PATENT DOCUMENTS

| | | | |
|---|---|---|---|
| 11,146,847 B1* | 10/2021 | Harshawat | G06F 3/0481 |
| 2003/0216133 A1* | 11/2003 | Poltorak | G08B 27/008 |
| | | | 455/404.1 |
| 2005/0118984 A1 | 6/2005 | Akiyama et al. | |

(Continued)

FOREIGN PATENT DOCUMENTS

CN    105763953 A    7/2016

OTHER PUBLICATIONS

"Emergency Alert System (EAS) Implementation for OTT, Broadcast, and Streaming Media Media & Entertainment (M&E)", Cybage, 2017, 6 pages.

*Primary Examiner* — Jefferey F Harold
*Assistant Examiner* — Franklin S Andramuno
(74) *Attorney, Agent, or Firm* — CHIP LAW GROUP

(57) ABSTRACT

An electronic device and method for emergency alert message detection based on audio-video information is disclosed. The electronic device receives first media content received over a first broadcast channel. The electronic device renders second media content, which is different from the first media content. The electronic device further detects, from the received first media content, a set of objects associated with a geo-location corresponding to the electronic device. The set of objects corresponds to an emergency at the geo-location. The electronic device further detects an emergency alert audio in the received first media content. The electronic device further extracts an emergency alert message received over a second broadcast channel associated with the geo-location based on the detected set of objects and the emergency alert audio in the received first media content. The electronic device further renders an emergency alert signal associated with the emergency alert message.

19 Claims, 9 Drawing Sheets

(56) References Cited

U.S. PATENT DOCUMENTS

| | | | |
|---|---|---|---|
| 2014/0329486 A1* | 11/2014 | Choi | H04W 4/80 455/404.1 |
| 2022/0070643 A1* | 3/2022 | Ahmet | H04L 67/12 |
| 2022/0272659 A1* | 8/2022 | Agiwal | H04W 74/0833 |

* cited by examiner

EMERGENCY ALERT MESSAGE DETECTION ON ELECTRONIC DEVICE BASED ON AUDIO-VIDEO INFORMATION

CROSS-REFERENCE TO RELATED APPLICATIONS/INCORPORATION BY REFERENCE

None

FIELD

Various embodiments of the disclosure relate to emergency alert messages. More specifically, various embodiments of the disclosure relate to an electronic device and method for emergency alert message detection based on audio-video information.

BACKGROUND

Advancements in electronics and communication technology have led to development of various techniques to detect and render emergency alert messages on electronic devices, such as, televisions. Typically, an emergency alert message may be communicated over a pre-determined broadcast channel to an electronic device (for example, a television) that may receive multiple broadcast channels. On detection of the emergency alert message at a service provider device associated with the electronic device, the service provider device (i.e., a broadcaster device) may switch a signal that may be broadcasted to the electronic device with the emergency alert message. Based on the switch of the broadcasted signal to the emergency alert message at the service provider device, the electronic device may receive and render the emergency alert message. However, the switch of the broadcasted signal to the emergency alert message at the service provider device may be abrupt and may impact a user experience of a viewer of the television. In certain cases, the emergency alert message may not be relevant to the viewer, and the viewer may choose to ignore the emergency alert message. In such cases, the switch of the broadcasted signal may be unnecessary. In addition, in certain scenarios, the viewer may be interested to view or may be viewing non-broadcast content through the electronic device. For example, the electronic device may be used to view the non-broadcast content either stored on a media storage device associated with the electronic device or received via an internet or via an over-the-top (OTT) platform. In such cases, the emergency alert messages may not be delivered to the electronic device, as the electronic device may not be tuned-in to any broadcast channel broadcasted by the service provider device. At the time of an emergency, the emergency alert messages may be missed by the electronic device which may further impact the viewer at an extent.

Limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and method for emergency alert message detection on the electronic device based on audio-video information is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
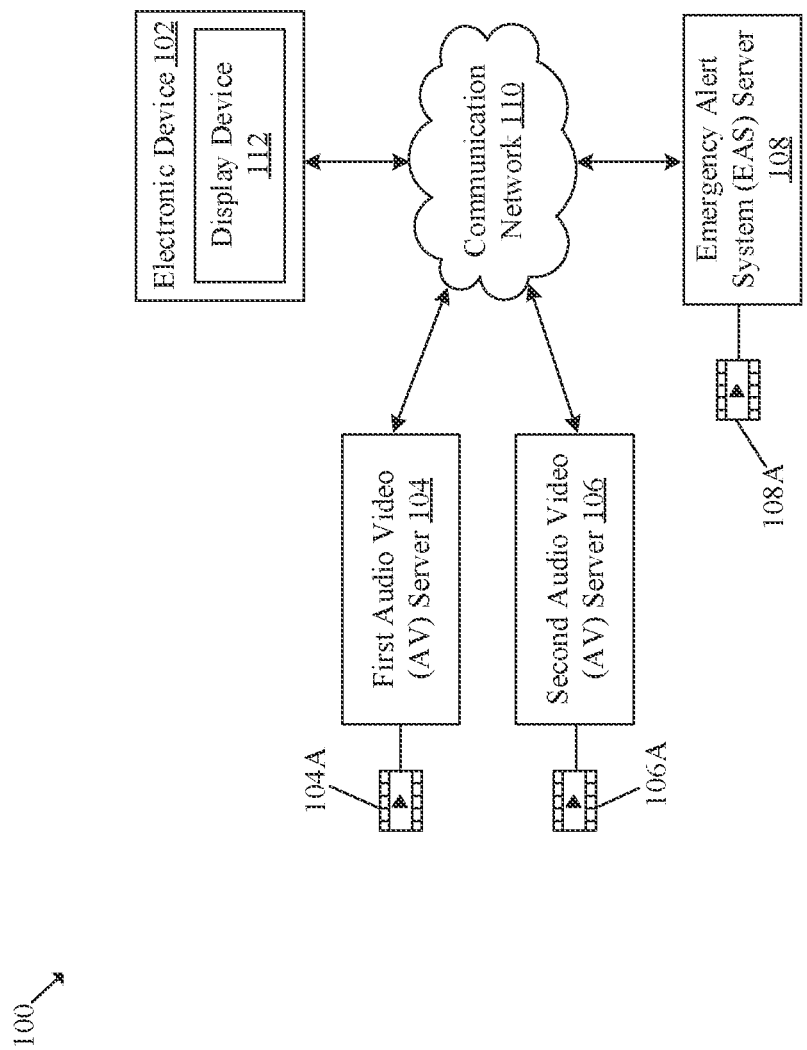
FIG. 1 is a block diagram that illustrates an exemplary network environment for emergency alert message detection on an electronic device based on audio-video information, in accordance with an embodiment of the disclosure.

The following described implementation may be found in the disclosed electronic device and method for emergency alert message detection on the electronic device based on audio-video information. Exemplary aspects of the disclosure provide an electronic device (for example, a television (TV), a display device, a mobile phone, or a sound system) that may detect an emergency alert message based on audio-video information. The electronic device may be configured to receive first media content over a first broadcast channel. As an example, the first media content may correspond to over-the-air (OTA) media content, television (TV) broadcast content, satellite TV content, or cable TV content. The electronic device may be further configured to control a display device associated with the electronic device to render second media content. The second media content may be different from the first media content. As an example, the second media content may correspond to one of over-the-top (OTT) media content, streaming media content, media content stored on the electronic device, or media content received from an Internet.

The electronic device may be further configured to detect, from the received first media content, a set of objects (for example, but is not limited to, an individual, a podium, a desk, a flag, or an emblem) associated with a geo-location corresponding to the electronic device. In an embodiment, the set of objects may correspond to an emergency (e.g., a natural calamity, a pandemic, an earthquake, a flood, a tornado, or a war) at the geo-location. The electronic device may be further configured to detect an emergency alert audio in the received first media content. The electronic device may be further configured to extract an emergency alert message received over a second broadcast channel associated with the geo-location based on the detected set of objects and the detected emergency alert audio in the received first media content. Thereafter, the electronic device may be configured to control an output of an emergency alert signal, associated with the extracted emergency alert message. As an example, the emergency alert signal may include at least one of audio content, video content, or text content.

In one scenario, the electronic device may output the emergency alert signal in a single-view mode, such that the audio content, the video content, and/or the text content associated with or included in the emergency alert signal may be output concurrently. In another scenario, the electronic device may output the emergency alert signal and the second media content in a composite-view mode, such that the audio content associated with the emergency alert signal and video content associated with the second media content may be output concurrently. In yet another scenario, the electronic device may output the emergency alert signal and the second media content in the composite-view mode, such that the video content and/or the text content associated with the emergency alert signal and audio content associated with the second media content may be output concurrently.

Typically, emergency alert messages may be communicated over pre-determined broadcast channels and may be detected at service provider devices. On detection of an emergency alert message, the service provider device may switch a broadcast channel (i.e., that may be currently tuned on a television device) with the pre-determined broadcast channel associated with the emergency alert message. Once the television device is tuned to the pre-determined broadcast channel associated with the emergency alert message, the television device may render the emergency alert message. However, the switch to the pre-determined broadcast channel based on the detection of the emergency alert message at the service provider device may be abrupt and may impact a viewing experience of a viewer of the television device. In many cases, the emergency alert message may not be relevant to the viewer, and viewer may choose to ignore the emergency alert message. For example, the emergency alert message may be related to a geo-location that may not be associated with the viewer and/or the television device. In such cases, the switch to the pre-determined broadcast channel may be unnecessary. Further, in case the television device is not tuned to any broadcast channel and renders non-broadcast content (such as, streaming content, OTT content, or content stored on a media storage device (like a universal serial bus (USB) drive, a compact disc, a Solid-State Drive or a secure digital card)), the television device may be unable to receive the emergency alert message (i.e. related to an emergency) from the service provider device, which may further impact the viewer.

In contrast, the disclosed electronic device may extract the emergency alert message from an emergency broadcast channel based on the set of objects (e.g., an individual, a podium, a desk, a flag, or an emblem) automatically detected from another broadcast channel, at the time a viewer of the electronic device may be watching or listening to content related to the non-broadcast content (for example an OTT content). The set of objects may be associated with the geo-location (e.g., a location where the viewer resides) associated with the electronic device. The set of objects may correspond to an emergency (e.g., a natural calamity, a disease (such as, a pandemic), or a war) at the geo-location. As the set of objects may be related to the emergency at the geo-location associated with the viewer, the emergency alert message extracted based on the detected set of objects may be relevant to the viewer. Further, the electronic device may detect the emergency alert audio in the received first media content (i.e., received via a broadcast channel) to corroborate whether the detected set of objects correspond to the emergency. The disclosed electronic device may extract the emergency alert message based on the automatic detection of the set of objects and the detection of the emergency alert audio in the first media content, when the viewer may not be rendering content from the broadcast channel or rendering the non-broadcast content (for example the OTT content). Therefore, the disclosed electronic device ensures that the viewer may not miss any important emergency alert message (i.e., received on the broadcast channel), even in a case when the non-broadcast content is being rendered to the viewer.

The disclosed electronic device may output the extracted emergency alert message in a single-view mode in which the audio, video, and text content of the emergency alert message may be output. Alternatively, the electronic device may output the extracted emergency alert message in a composite-view mode. In one scenario of the composite-view mode, the audio content of the emergency alert message may be output concurrently with the video content of the second media content (i.e., non-broadcast content). In another scenario of the composite-view mode, the video content and/or the text content of the emergency alert message may be output concurrently with the audio content of the second media content. Thus, the disclosed electronic device may enable the viewer to view and listen to the emergency alert message attentively in the single view-mode in case the emergency alert message is important to viewer. Alternatively, the disclosed electronic device may enable the viewer to listen to the audio of the emergency alert message and continue to watch the second media content or watch/read the emergency alert message and continue to listen to the second media content. Herein, the emergency alert message may be delivered to the viewer and further consumed by the viewer in the background while the viewer continues to consume the second media content (i.e., non-broadcast content). Thus, the experience of the viewer may be enhanced as the viewer may not be disturbed by the abrupt channel switch on the detection of the emergency alert message.

FIG. 1 is a block diagram that illustrates an exemplary network environment for emergency alert message detection on an electronic device based on audio-video information, in accordance with an embodiment of the disclosure. With reference to FIG. 1, there is shown a network environment 100. The network environment 100 may include an electronic device 102, a first audio-video (AV) server 104, a second AV server 106, and an emergency alert system (EAS) server 108. The electronic device 102, first AV server 104, the second AV server 106, and the EAS server 108 may be communicatively coupled with each other, via a communication network 110. The electronic device 102 may further include a display device 112.

The electronic device 102 may include suitable logic, circuitry, interfaces, and/or code that may be configured to receive media content from an AV source (not shown). In an exemplary embodiment, the electronic device 102 may be a display-enabled media player that may be configured to render the received media content through the display device 112 that may be included in the electronic device 102. The electronic device 102 may further include a speaker device (not shown) to output audio associated with the received media content. In an embodiment, the electronic device 102 may be configured to detect an emergency alert message from media content based on audio-video information. Examples of such an implementation of the electronic device 102 may include, but are not limited to, a television (TV), an Internet-Protocol TV (IPTV), a smart TV, a smartphone, a personal computer, a laptop, a tablet, a wearable electronic device, a display device with a capability to receive, decode, and play media content associated with broadcast channels from cable or satellite networks, over-the-air broadcast, or Internet-based telecasts, or any display device with a capability to receive, decode, and play non-broadcast media content (such as, over-the-top (OTT) media content, streaming media content, media content stored on the electronic device 102, or media content received from an Internet).

In an exemplary embodiment, the electronic device 102 may include a media player that may communicate with the display device 112, via a wired or a wireless connection. Examples of such an implementation of the electronic device 102 may include, but are not limited to, a digital media player (DMP), a micro-console, a TV tuner, an Advanced Television Systems Committee (ATSC) tuner, a set-top-box, an Over-the-Top (OTT) player, a digital media streamer, a media extender/regulator, a digital media hub, a computer workstation, a mainframe computer, a handheld computer, a smart appliance, a plug-in device, and/or any other computing device with content streaming functionality.

The AV source may include suitable logic, circuitry, and interfaces that may be configured to transmit the media content to the electronic device 102. In an embodiment, the AV source may be implemented as a storage device which may store the media content. Examples of such an implementation of the AV source may include, but are not limited to, a media storage device, a media server, a database server, a portable disk drive, a Flash drive, a Hard Disk Drive (HDD), a Solid-State Drive (SSD), and/or a Secure Digital (SD) card. In another embodiment, the AV source may be implemented as a media streaming server, which may transmit the media content to the electronic device 102, via the communication network 110. In an embodiment, the AV source may be an TV tuner, such as an ATSC tuner, which may receive digital TV (DTV) signals from an over-the-air broadcast network and may extract the media content from the received DTV signal. Thereafter, the AV source may transmit the extracted media content to the electronic device 102. In an embodiment, the AV source, and the electronic device 102 may be implemented as two separate devices. However, in some embodiments, the functionality of the AV source may be incorporated in its entirety or at least partially in the electronic device 102, without departing from the scope of the present disclosure.

The display device 112 may include suitable logic, circuitry, and interfaces that may be configured to display an output of the electronic device 102. The display device 112 may be utilized to render media content. The display device 112 may be further configured to output an emergency alert signal. The display device 112 may be a unit that interfaces or connects with the electronic device 102, through an input/output (I/O) port (such as a High-Definition Multimedia Interface (HDMI) port) or a network interface. Alternatively, the display device 112 may be an embedded component of the electronic device 102. In an embodiment, the display device 112 may include an inbuilt speaker device (not shown). Alternatively, the speaker device may be external to the display device 112, and the display device 112 may be communicatively coupled to the speaker device.

In at least one embodiment, the display device 112 may be a touch screen which may enable a user to provide a user-input via the display device 112. The display device 112 may be realized through several known technologies such as, but not limited to, at least one of a Liquid Crystal Display (LCD) display, a foldable or rollable display, a Light Emitting Diode (LED) display, a plasma display, or an Organic LED (OLED) display technology, or other display devices. In accordance with an embodiment, the display device 112 may refer to a display screen of a head mounted device (HMD), a smart-glass device, a see-through display, a projection-based display, an electro-chromic display, or a transparent display.

Each server (such as, the first AV server 104, the second AV server 106, and the EAS server 108) may include suitable logic, circuitry, and interfaces, and/or code that may be configured to store media content and transmit the stored media content to the electronic device 102. For example, the first AV server 104 may be configured to store first media content 104A. Similarly, the second AV server 106 and the EAS server 108 may store second media content 106A and media content associated with an emergency alert signal 108A, respectively. In an exemplary embodiment, each server (such as, the first AV server 104, the second AV server 106, and the EAS server 108) may be implemented as a cloud server and may execute operations through web applications, cloud applications, HTTP requests, repository operations, file transfer, and the like. Other example implementations of the server (such as, the first AV server 104, the second AV server 106, and the EAS server 108) may include, but are not limited to, a database server, a file server, a content server, a web server, an application server, a mainframe server, or a cloud computing server.

In at least one embodiment, the server (such as, the first AV server 104, the second AV server 106, and the EAS server 108) may be implemented as a plurality of distributed cloud-based resources by use of several technologies that are well known to those ordinarily skilled in the art. A person with ordinary skill in the art will understand that the scope of the disclosure may not be limited to the implementation of the server (such as, the first AV server 104, the second AV server 106, and/or the EAS server 108) and the electronic device 102 as two separate entities. In certain embodiments, the functionalities of the server (such as, the first AV server 104, the second AV server 106, and/or the EAS server 108) may be incorporated in its entirety or at least partially in the electronic device 102, without a departure from the scope of the disclosure.

Though not shown in FIG. 1, the network environment 100 may further include a service provider device that may be connected to the electronic device 102 through the communication network 110. The service provider device may include suitable logic, circuitry, and/or interfaces that may be configured to transmit and receive signals associated with one or more service providers. The transmitted or received signals may correspond to a set of broadcast channels, for example, radio frequency (RF) signals, which may be broadcasted in a certain geographical region. For example, each service provider device may include a transmitter configured to transmit selected broadcast channel information, media content, and/or other multimedia services to the electronic device 102 based on a current geo-location of the electronic device 102 within its emissions (like an available channel guide in the region). In an embodiment, at least one of the first AV server 104 and/or the EAS server 108 may include one or more service provider devices. Examples of the service provider may include, but are not limited to, a satellite broadcaster, a terrestrial broadcaster, a digital television broadcaster, a cellular network broadcaster, or Internet broadcaster. Examples of the service provider devices may include, but are not limited to, a radio antenna, a monopole antenna, a dipole antenna, an array antenna, or a loop antenna.

The communication network 110 may include a communication medium through which the electronic device 102, the first AV server 104, the second AV server 106, and the EAS server 108, may communicate with each other. Examples of the communication network 110 may include, but are not limited to, the Internet, a cloud network, a Wireless Local Area Network (WLAN), a Wireless Fidelity (Wi-Fi) network, a Personal Area Network (PAN), a Local Area Network (LAN), a telephone line (POTS), and/or a Metropolitan Area Network (MAN), a mobile wireless network, such as a Long-Term Evolution (LTE) network (for example, 4th Generation or 5th Generation (5G) mobile network (i.e., 5G New Radio)). Various devices in the network environment 100 may be configured to connect to the communication network 110, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity (Li-Fi), 802.16, IEEE 802.11s, IEEE 802.11g, multi-hop communication, wireless access point (AP), device to device communication, cellular communication protocols, or Bluetooth (BT) communication protocols, or a combination thereof.

In operation, the electronic device 102 may be configured to receive a user input, for example, to turn-on the electronic device 102 and tune in to a first broadcast channel or select non-broadcast media content. Based on the user input, the electronic device 102 may be configured turn-on and perform a set of operations, such as, tune-into a broadcast channel, render media content from a non-broadcast source, detect an emergency alert message, and output an emergency alert signal associated with the emergency alert message, as described herein.

At a time-instance, the electronic device 102 may receive the first media content 104A over the first broadcast channel. The first media content 104A may be received from the first AV server 104. In an embodiment, the first media content 104A may correspond to one of, but is not limited to, over-the-air (OTA) media content, television (TV) broadcast content, satellite TV content, or cable TV content. The electronic device 102 may further control the display device 112 associated with the electronic device 102 to render the second media content 106A selected from the non-broadcast source. The second media content 106A may be different from the first media content 104A. In an embodiment, the second media content 106A may correspond to one of, but not limited to, over-the-top (OTT) media content, streaming media content, media content stored on the electronic device 102 (or stored in a storage device coupled or integrated with the electronic device 102), or media content received from the second AV server 106, or an Internet. The media content (such as the first media content 104A, and the second media content 106A) may be any digital data, which may be rendered, streamed, broadcasted, or stored on any electronic device or storage. Examples of the media content may include, but are not limited to, images (such as overlay graphics), animations (such as 2D/3D animations or motion graphics), audio/video data, conventional television programs (provided via traditional broadcast, cable, satellite, Internet, or other means), pay-per-view programs, on-demand programs (as in video-on-demand (VOD) systems), or Internet content (e.g., streaming media, downloadable media, Webcasts, etc.). The details of rendering the first media content 104A, and the second media content 106A, are further described, for example, in FIG. 3A.

The electronic device 102 may detect, from the received first media content 104A, a set of objects associated with a geo-location corresponding to the electronic device 102. For e.g., the set of objects may include, but are not limited to, an individual, a podium, a desk, a flag, or an emblem associated with the geo-location (e.g., a location where the viewer resides) associated with the electronic device 102. The set of objects may correspond to an emergency (e.g., a natural calamity (such as earthquake, tornado, flood). a disease (such as, a pandemic), or a war) at the geo-location. In an embodiment, the set of objects may be a visual object which may be indicative of the emergency at the geo-location of the electronic device 102. The details associated with detection of the set of objects, are further described, for example, in FIGS. 3A, and 4A.

Figure 2:
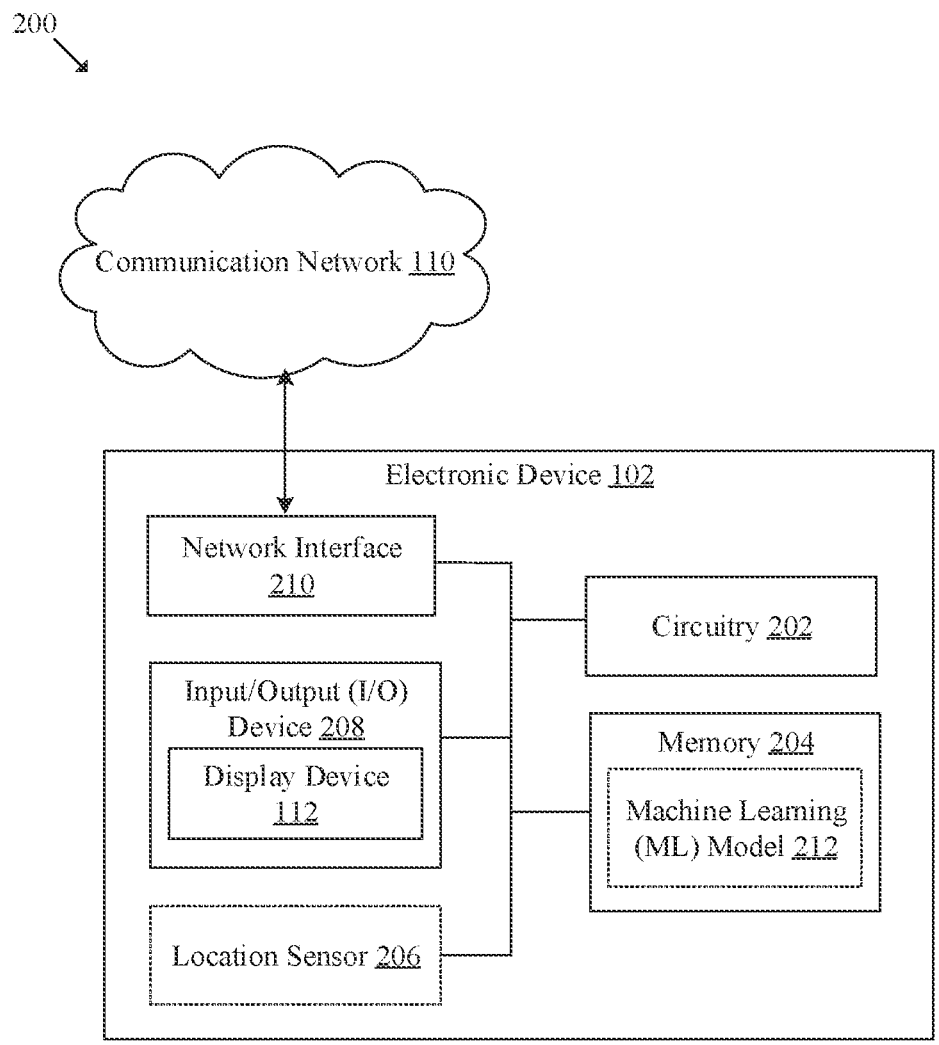
FIG. 2 is a block diagram that illustrates an exemplary electronic device of FIG. 1, in accordance with an embodiment of the disclosure.

The geo-location corresponding to the electronic device 102 may be a current geo-location where the electronic device 102 may be present and/or in use. For example, the location may be a state, a province, a city, a town, or a country where the electronic device 102 may be present. In an embodiment, the electronic device 102 may be configured to determine the geo-location corresponding to the electronic device 102 based on at least one of a user input or a location sensor (as shown in FIG. 2) associated with the electronic device 102. In an embodiment, the electronic device 102 may be configured to determine the geo-location corresponding to the electronic device 102 based on at least one of Global Positioning System (GPS) information, an Internet Protocol (IP) address, or identification information of the first broadcast channel. The electronic device 102 may include an integrated location sensor, for example, a Global Positioning System (GPS) sensor, that may be configured to determine the geo-location based on geo-location information such as, but not limited to, a latitude, a longitude, and an altitude associated with the geo-location. In an embodiment, the electronic device 102 may automatically determine the geo-location corresponding to the electronic device 102 based on the geo-location information captured by the GPS sensor. In another embodiment, the electronic device 102 may automatically determine the geo-location based on the IP address associated with the electronic device 102. The IP address may be configured in the electronic device 102 during a setup of the electronic device 102 or during an installation of a particular application in the electronic device 102. In another embodiment, the electronic device 102 may automatically determine the geo-location based on the identification information of the first broadcast channel. The electronic device 102 may receive the identification information (e.g., broadcaster ID) from the first broadcast channel. The first broadcast channel may be available or telecasted in certain regions that may include the geo-location associated with the electronic device 102. Thus, the identification information of the first broadcast channel may be used to determine the geo-location of the electronic device 102.

In an embodiment, the electronic device 102 may receive a user input (for example, via an I/O device of FIG. 2) indicative of at least one of a country, a state, a city, a province, position co-ordinates, a postal code, or a zip code associated with the electronic device 102. The electronic device 102 may determine the geo-location based on the received user input.

The electronic device 102 may further detect an emergency alert audio in the received first media content 104A (i.e., received over the first broadcast channel). Further, the electronic device 102 may extract an emergency alert message received over a second broadcast channel associated with the geo-location, based on the detected set of objects and the detected emergency alert message, as described, for example, in FIG. 3B. The electronic device 102 may further output an emergency alert signal (e.g., the emergency alert signal 108A). The emergency alert signal 108A may be associated with the detected emergency alert message. The media content associated with the emergency alert signal 108A may include at least one of audio content, video content, or text content. The details associated with the output of the emergency alert signal, are described, for example, in FIG. 3B.

FIG. 2 is a block diagram that illustrates an exemplary electronic device of FIG. 1, in accordance with an embodiment of the disclosure. FIG. 2 is explained in conjunction with elements from FIG. 1. With reference to FIG. 2, there is shown the electronic device 102. The electronic device 102 may include circuitry 202, a memory 204, a location sensor 206, an input/output (I/O) device 208, and a network interface 210. The I/O device 208 may include the display device 112. The memory 204 may include a machine learning (ML) model 212. The network interface 210 may connect the electronic device 102 with the first AV server 104, the second AV server 106, and the EAS server 108, via the communication network 110.

The circuitry 202 may include suitable logic, circuitry, and/or interfaces that may be configured to execute program instructions associated with different operations to be executed by the electronic device 102. The operations may include reception of the first media content 104A, control of the display device 112 to render the second media content 106A, detection of the set of objects, detection of the emergency alert audio, extraction of the emergency alert message, and control of an output of the emergency alert signal. The circuitry 202 may include one or more processing units, which may be implemented as a separate processor. In an embodiment, the one or more processing units may be implemented as an integrated processor or a cluster of processors that perform the functions of the one or more specialized processing units, collectively. The circuitry 202 may be implemented based on a number of processor technologies known in the art. Examples of implementations of the circuitry 202 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 204 may include suitable logic, circuitry, interfaces, and/or code that may be configured to store one or more instructions to be executed by the circuitry 202. The memory 204 may be configured to store the ML model 212 and media content (such as the first media content 104A, the second media content 106A, and the emergency alert message). The memory 204 may be further configured to store geo-location information corresponding to the electronic device 102. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The ML model 212 may be trained on a task to detect the set of objects (that may correspond to a geo-location) from the first media content (that may be received over the first broadcast channel). For example, the ML model 212 may be trained to analyze the received first media content to detect a flag, a podium, an emblem, a political figure, an eminent personality, or a government official (or any visual object that may correspond to an emergency) associated with the geo-location of the electronic device 102. In an embodiment, the ML model 212 may be trained determine a discontinuity in input media content based on a set of audio samples related to an emergency alert audio in the input media content. In an embodiment, the ML model 212 may be trained to convert audio samples in input media content to corresponding textual information. In certain scenarios, the ML model 212 may be implemented as a combination of ML models including at least one of a first ML model trained to detect the set of objects, a second ML model trained to determine the discontinuity in input media content, and/or a third ML model trained to convert audio samples in input media content to corresponding textual information.

In an embodiment, the ML model 212 may be implemented as a deep learning model. The deep learning model may be defined by its hyper-parameters and topology/architecture. For example, the deep learning model may be a deep neural network-based model that may have a number of nodes (or neurons), activation function(s), number of weights, a cost function, a regularization function, an input size, a learning rate, number of layers, and the like. Such a model may be referred to as a computational network or a system of nodes (for example, artificial neurons). For a deep learning implementation, the nodes of the deep learning model may be arranged in layers, as defined in a neural network topology. The layers may include an input layer, one or more hidden layers, and an output layer. Each layer may include one or more nodes (or artificial neurons, represented by circles, for example). Outputs of all nodes in the input layer may be coupled to at least one node of hidden layer(s). Similarly, inputs of each hidden layer may be coupled to outputs of at least one node in other layers of the model. Outputs of each hidden layer may be coupled to inputs of at least one node in other layers of the deep learning model. Node(s) in the final layer may receive inputs from at least one hidden layer to output a result. The number of layers and the number of nodes in each layer may be determined from the hyper-parameters, which may be set before, while, or after training the deep learning model on a training dataset.

Each node of the deep learning model may correspond to a mathematical function (e.g., a sigmoid function or a rectified linear unit) with a set of parameters, tunable during training of the model. The set of parameters may include, for example, a weight parameter, a regularization parameter, and the like. Each node may use the mathematical function to compute an output based on one or more inputs from nodes in other layer(s) (e.g., previous layer(s)) of the deep learning model. All or some of the nodes of the deep learning model may correspond to same or a different mathematical function. In training of the deep learning model, one or more parameters of each node may be updated based on whether an output of the final layer for a given input (from the training dataset) matches a correct result based on a loss function for the deep learning model. The above process may be repeated for same or a different input until a minima of loss function is achieved, and a training error is minimized. Several methods for training are known in the art, for example, gradient descent, stochastic gradient descent, batch gradient descent, gradient boost, meta-heuristics, and the like.

In an embodiment, the ML model 212 may include electronic data, which may be implemented as, for example, a software component of an application executable on the electronic device 102. The ML model 212 may include code and routines that may be configured to enable a computing device, such as the electronic device 102 to perform one or more operations for detection of the emergency alert message. Additionally, or alternatively, the ML model 212 may be implemented using hardware including, but not limited to, a processor, a microprocessor (e.g., to perform or control performance of one or more operations), a field-programmable gate array (FPGA), a co-processor (such as an AI-accelerator), or an application-specific integrated circuit (ASIC). In some embodiments, the trained ML model 212 may be implemented using a combination of both hardware and software.

In certain embodiments, the ML model 212 may be implemented based on a hybrid architecture of multiple Deep Neural Networks (DNNs). Examples of the ML model 212 may include a neural network model, such as, but are not limited to, an artificial neural network (ANN), a deep neural network (DNN), a convolutional neural network (CNN), a recurrent neural network (RNN), a CNN-recurrent neural network (CNN-RNN), R-CNN, Fast R-CNN, Faster R-CNN, a Residual Neural Network (Res-Net), a Feature Pyramid Network (FPN), You Only Look Once (YOLO) model, a Single Shot Detector (SSD), CNN-recurrent neural network (CNN-RNN), a Long Short-Term Memory (LSTM) network based RNN, LSTM+ANN, and/or a combination thereof.

The location sensor 206 may include suitable logic, circuitry, and/or interfaces that may be configured to determine a geo-location corresponding to the electronic device 102. Examples of the location sensor 206, may include, but are not limited to, a Global Navigation Satellite System (GNSS)-based sensor of the electronic device 102. Examples of the GNSS-based sensor may include, but are not limited to, global positioning sensor (GPS), Global Navigation Satellite System (GLONASS), or other regional navigation systems or sensors.

The I/O device 208 may include suitable logic, circuitry, interfaces, and/or code that may be configured to receive an input and provide an output based on the received input. The I/O device 208 may include various input and output devices, which may be configured to communicate with the circuitry 202. In an example, the electronic device 102 may receive (via the I/O device 208) the user input indicative of the location corresponding to the electronic device 102. Further, the electronic device 102 may receive (via the I/O device 208) a user input indicative of information related to the second media content 106A (for example, a non-broadcast content, such as a video stored in the memory 204). For example, the information related to the second media content 106A may include a file name and a storage location path associated with the second media content 106A. Alternatively, in case the second media content 106A is OTT media content, the information may include login credentials of an OTT media platform that hosts the OTT media content and a name of the OTT media content. In an example, the electronic device 102 may display (via the display device 112 associated with the I/O device 208) the detected emergency alert message, the first media content 104A, and the second media content 106A. Examples of the I/O device 208 may include, but are not limited to, a touch screen, a keyboard, a mouse, a joystick, a display device (for example, the display device 112), a microphone, or a speaker.

The network interface 210 may include suitable logic, circuitry, interfaces, and/or code that may be configured to facilitate communication between the electronic device 102, the first AV server 104, the second AV server 106, and the EAS server 108, via the communication network 110. The network interface 210 may be implemented by use of various known technologies to support wired or wireless communication of the electronic device 102 with the communication network 110. The network interface 210 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 210 may be configured to communicate via wireless communication with networks, such as the Internet, an Intranet, a wireless network, a cellular telephone network, a wireless local area network (LAN), or a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS). Various operations of the circuitry 202 for emergency alert message detection and rendering on the electronic device 102 are described further, for example, in FIGS. 3A, 3B, 4A, 4B, 4C, 5A, 5B, 5C, and 6.

Figure 3A:
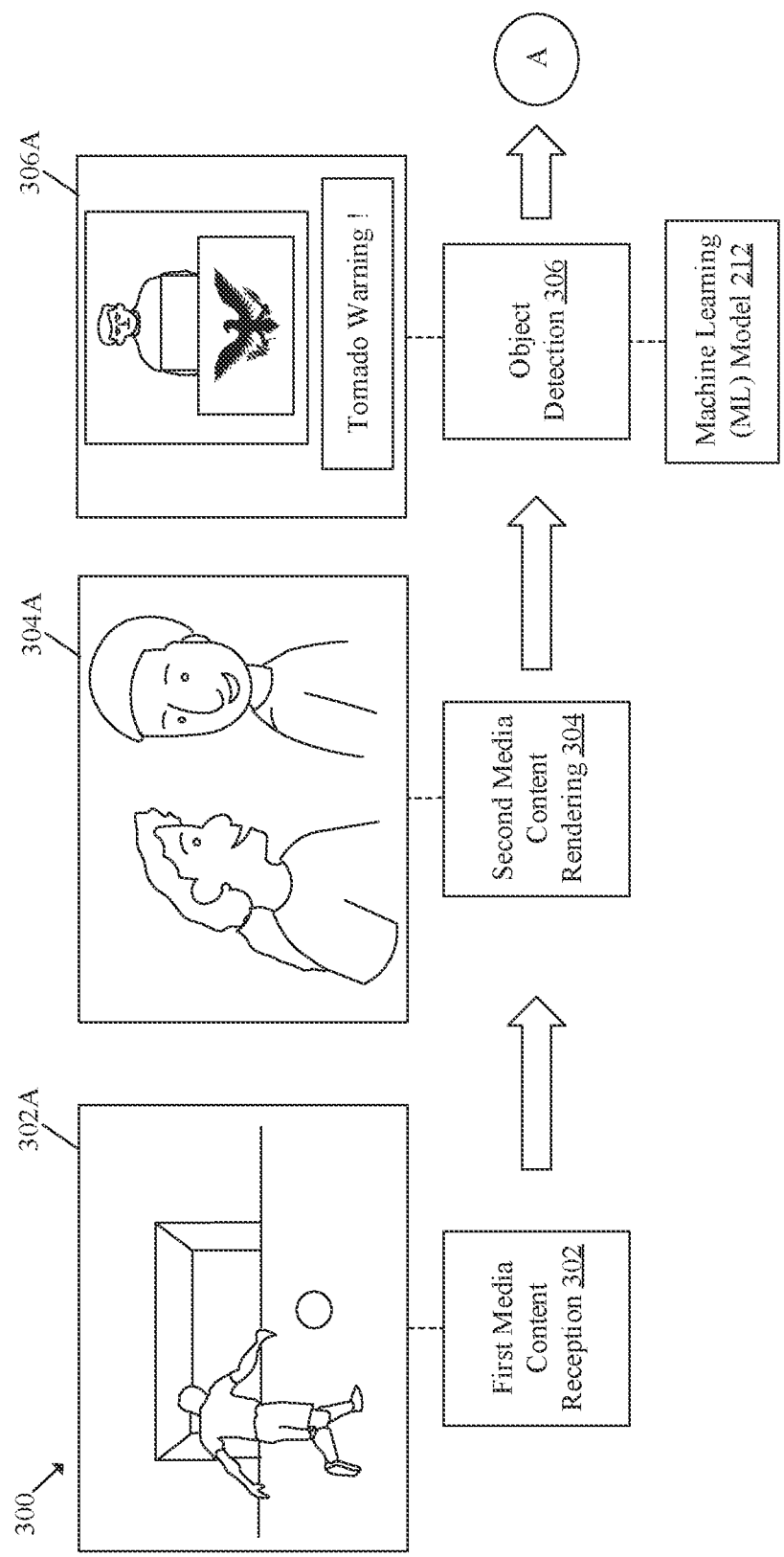
FIGS. 3A and 3B, collectively depict a diagram that illustrates an exemplary processing pipeline for emergency alert message detection on an electronic device based on audio-video information, in accordance with an embodiment of the disclosure.
Figure 3B:
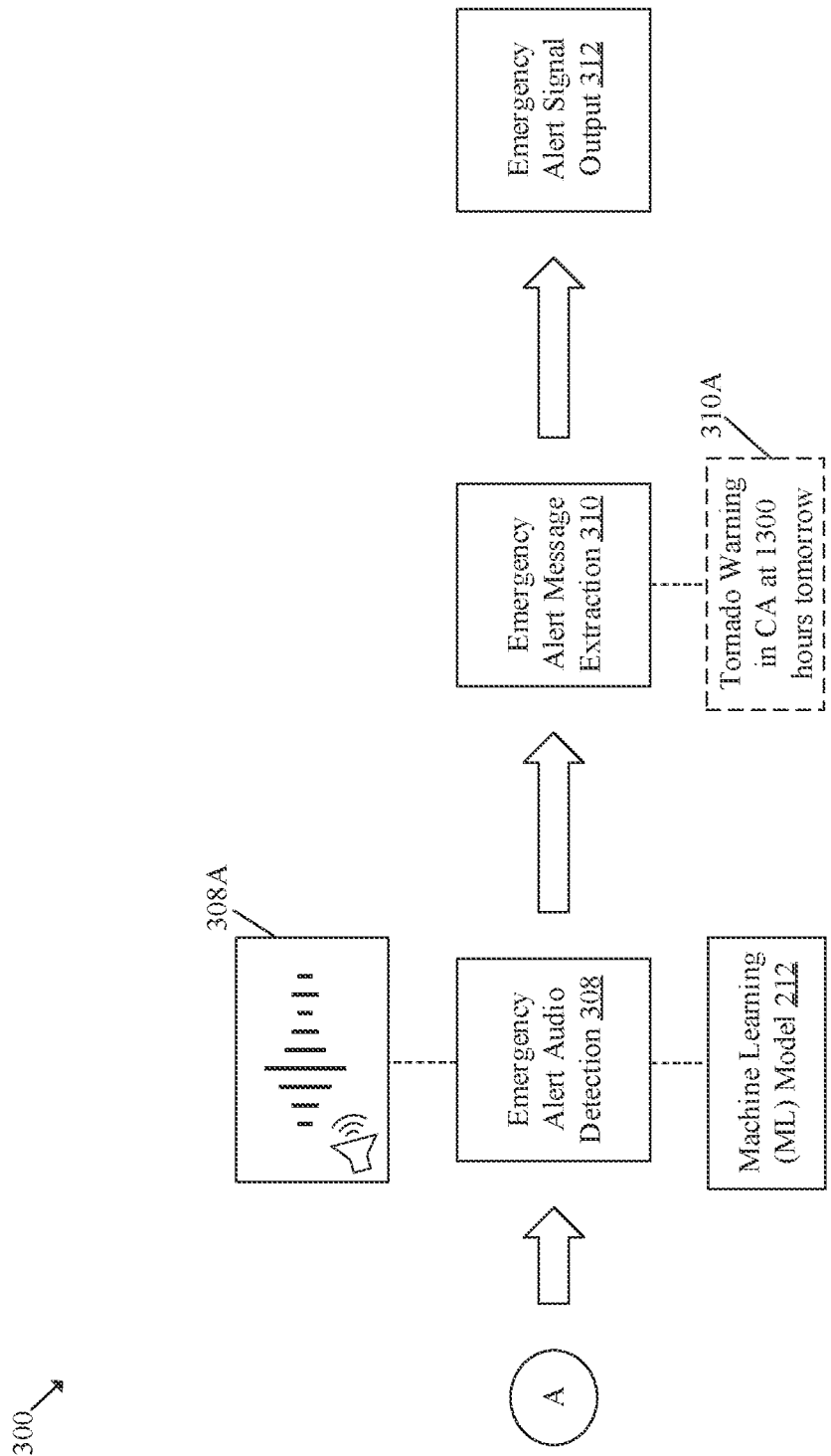

FIGS. 3A and 3B, collectively depict a diagram that illustrates an exemplary processing pipeline for emergency alert message detection on an electronic device based on audio-video information, in accordance with an embodiment of the disclosure. FIGS. 3A and 3B are explained in conjunction with elements from FIG. 1 and FIG. 2. With reference to FIGS. 3A and 3B, there is shown an exemplary processing pipeline 300 that illustrates exemplary operations from 302 to 312 for detection of emergency alert message on the electronic device 102 based on audio-video information. The exemplary operations may be executed by any computing system, for example, by the electronic device 102 of FIG. 1 or by the circuitry 202 of FIG. 2.

At 302, the first media content 104A may be received. In an embodiment, the circuitry 202 may be configured to receive a first media content (e.g., a first media content 302A) over a first broadcast channel. Prior to the reception of the first media content 302A, the circuitry 202 may be configured to receive a user input, that may include an instruction to turn on the electronic device 102 and tune to the first broadcast channel. The circuitry 202 may be configured to receive the user input, via the I/O device 208 associated with the electronic device 102. Based on the received user input, the circuitry 202 may be configured to turn on and scan a set of broadcast channels as per a geo-location of the electronic device 102. The circuitry 202 may be configured to determine a geographical region including the geo-location associated with the electronic device 102. The determination of the geo-location associated with the electronic device 102 is described further, for example, in FIG. 1. The set of broadcast channels associated with the determined geographical region may be received from a service provider device (not shown) associated with a service provider. The service provider device may use standard broadcasting protocols or common channel broadcasting protocols to broadcast the set of broadcast channels to electronic devices associated with the geographic region. The geographical region may correspond to an area of a city, state, province, or a country to which the electronic device 102 may belong or located.

In an embodiment, to receive the first media content 302A, the circuitry 202 may be configured to tune into the first broadcast channel of the set of broadcast channels, via a tuner or a frequency scanner (not shown) in the electronic device 102. The tuner or frequency scanner may be configured to tune a broadcast channel frequency of the selected first broadcast channel to receive a signal (related to the first media content 302A) communicated on the selected first broadcast channel. The tuner or the frequency scanner may amplify the received signal of the selected first broadcast channel, and further demodulate the amplified signal of the selected first broadcast channel on the electronic device 102, to further receive the first media content 302A. A detailed description for the other components or systems of the electronic device 102 is omitted from the disclosure for the sake of brevity. In FIG. 3A, there is shown, an exemplary image frame of the first media content 302A that may be received by the electronic device 102.

In an embodiment, the first media content 302A may correspond to one of, but not limited to, over-the-air (OTA) media content, television (TV) broadcast content, satellite TV content, or cable TV content. For example, the OTA media content may correspond to media content received over a first OTA channel associated with a particular OTA frequency. The circuitry 202 may render the OTA media content that may be aired or broadcast on the particular OTA frequency. The TV broadcast content may correspond to media content received over a first TV broadcast channel. Examples of the TV broadcast channel may include, but are not limited to, a National Television System Committee (NTSC) channel, an Advanced Television System Committee (ATSC) channel, a Digital Video Broadcast (DVB) channel, an Integrated Services Digital Broadcast (ISDB) channel, or a Digital Terrestrial Multimedia Broadcast (DTMB) channel. The satellite content may correspond to media content received over a first satellite broadcast channel, for example, but not limited to, a direct broadcast satellite (DBS) service, and direct-to-home (DTH) satellite service. The cable TV content may correspond to media content received over a first cable TV channel associated with a particular RF frequency signal transmitted via coaxial cables or fiber-optic cables.

At 304, the second media content 106A may be rendered. In an embodiment, the circuitry 202 may be configured to control the display device 112 to render a second media content (e.g., a second media content 304A). Herein, the second media content 304A may be different from the first media content 302A received over the first broadcast channel. In an embodiment, the second media content 304A may correspond to one of, but not limited to, an over-the-top (OTT) media content, streaming media content, media content stored on the electronic device 102, or media content received from the second AV server 106 or an Internet. For example, the OTT media content may correspond to media content received over a first OTT media service/platform via the Internet. The circuitry 202 may render the OTT media content (via the display device 112) that may be received from a particular OTT media service. The streaming media content may correspond to media content received over a streaming service. The media content stored on the electronic device 102 may correspond to a pre-recorded or media content stored on the memory 204 (or on any external storage device, such as a USB device, a compact disc (CD), solid-state device, and like) associated or directly coupled with the electronic device 102. The circuitry 202 may be configured to retrieve the media content stored on the electronic device 102 and render the retrieved media content (via the display device 112). Alternatively, the media content may be received from the second AV server 106 or an Internet. Such media content be any live or pre-recorded media content received from the second AV server 106 or the Internet. In FIG. 3A, there is shown, an exemplary image frame of the second media content 304A that may be rendered on the display device 112. In an exemplary scenario, where the second media content 304A (such as OTT media content) is rendered via the display device 112 (as per a preference of the viewer/listener of the electronic device 102), the received first media content 302A (i.e., broadcast media content) may not be rendered (via the display device 112 or via any other output device) at the same time. In other words, the viewer of the electronic device 102 might be watching the OTT content (i.e., the second media content 304A), but not watching the first media content 302A (i.e., received over the first broadcast) at the same time (i.e., for example in a composite-view mode, where two different media contents may be viewed at same time). Thus, in such case, the viewer may miss the emergency alert message broadcasted over a second broadcast channel and/or the first broadcast channel. Therefore, the disclosed electronic device 102 may automatically detect the set of objects and/or the emergency alert audio (i.e., corresponding to the emergency) from the received first media content 302A (i.e., even if the viewer may be watching the second media content 304A), and accordingly extract the emergency alert message from the second broadcast channel based on the detection, as further described, in FIG. 3 (at 306-312).

At 306, a set of objects may be detected. In an embodiment, the circuitry 202 may be configured to detect, from the received first media content 302A, the set of objects (e.g., a set of objects 306A) associated with the geo-location corresponding to the electronic device 102. For example, the set of objects 306A may include, but are not limited to, one or more individuals, a podium, a desk, a flag, or an emblem, associated with the geo-location corresponding to the electronic device 102. In an embodiment, the set of objects may correspond to an emergency (e.g., a natural calamity (such as earthquake, tornado, flood), a disease (such as pandemic), or a war) at the geo-location of the electronic device 102. As an example, the one or more individuals may correspond to state or local authorities, a head of a state, city, or country, a broadcaster, or news anchor.

In an embodiment, the circuitry 202 may be configured to apply a machine learning model (e.g., the ML model 212) on a set of image frames in the received first media content 302A. The machine learning model (e.g., the ML model 212) may be trained on an object detection task to detect the set of objects 306A from the first media content 302A. For example, a training dataset of the ML model 212 may include multiple frames of a plurality of media content and object tags associated with objects included in each of the plurality of media content. The objects may be pre-determined for one or more geo-locations of a geographical region. In an embodiment, the ML model 212 may be based on one or more computer vision models. The circuitry 202 may be configured to detect the set of objects 306A from the received first media content 302A based on the application of the ML model 212 (e.g., the one or more computer vision models) on the set of image frames in the first media content 302A.

In certain cases, the ML model 212 may detect one or more objects that may be similar to the set of objects 306A, from a group of image frames of the first media content 302A. However, the detected one or more objects may not be related to an emergency. For example, the ML model 212 may detect a podium, a desk, or a commentator of a sports event broadcast (e.g., a soccer match), a flag associated with a sports team (e.g., a soccer team), and an emblem or flag associated with a country associated with the sports team. In such case, the circuitry 202 may determine that though the detected one or more objects are similar to the set of objects 306A, the detected one or more objects may not be related to an emergency. The detected one or more objects may be however related to the sports event. The circuitry 202 may ignore the group of image frames, that include the detected one or more objects, for the detection of the set of objects 306A related to the emergency. In an embodiment, the circuitry 202 may re-train the ML model 212 to ignore the detected one or more objects for the object detection task to detect the set of objects 306A from the first media content 302A.

In an embodiment, the circuitry 202 may be configured to apply a machine learning model (e.g., the ML model 212) on a set of audio samples in the received first media content 302A to determine textual content related to the set of audio samples. The machine learning model (e.g., the ML model 212) may be trained to convert audio samples to corresponding textual information. For example, the ML model 212 may be a speech-to-text or an audio-to-text converter that may be based on a language model. In an embodiment, the circuitry 202 may be configured to determine a context associated with the determined textual content based on the geo-location associated with the electronic device 102. For example, the ML model 212 may apply one or more natural language processing (NLP) techniques on the determined textual content and on the geo-location to determine the context associated with the determined textual content of the set of audio samples associated with the set of image frames in the received first media content 302A. The set of audio samples may correspond to a dialogue, or a speech spoken or produced during the capture of the set of image frames in the received first media content 302A. For example, certain language slangs or idioms may be associated with a particular context (like emergency) for a particular geo-location. The use of such language slangs or idioms in case for the particular geo-location may indicate that the textual content may correspond to the particular context. For example, the ML model 212 may apply a language model specific to the geo-location associated with the electronic device 102 to determine the textual context of the determined textual content. In an embodiment, the circuitry 202 may be configured to detect the set of objects 306A from the received first media content 302A further based on the determined context. For example, in case the determined context corresponds to a "weather alert", a set of objects (such as, a map with an indication of heavy rains or storm) may be detected based on the determined context. In another example, in case of an accident, imminent danger, or natural disaster (e.g., storms, tornados, earthquakes), objects related to the emergency may be determined based on the textual context including words such as, "emergency", "high-alert", "red-alert", "warning", "mayday", "calamity", "earthquake", or "accident". The audio samples in the first media content 302A may be useful to corroborate whether the set of objects 306A are related to an emergency or not. For example, the textual context determined from audio samples of the first media content 302A indicates that the audio samples correspond to the set of objects 306A. In such case, if the analysis of the image frames corresponding to the same audio samples also leads to the detection of the set of objects 306A, there is a high probability that the detected set of objects relate to an emergency. Thus, the analysis of the audio samples (to determine textual context and associated textual context) may help to accurately determine whether the detected set of objects corresponds to an emergency situation or not for the geo-location of the electronic device 102.

In an embodiment, the circuitry 202 may be configured to determine the geo-location corresponding to the electronic device 102 based on at least one of a user input or the location sensor 206 associated with the electronic device 102, as described, for example, in FIG. 1. Based on the determined geo-location, the circuitry 202 may be further configured to determine a second broadcast channel from a plurality of broadcast channels received by the electronic device 102. The second broadcast channel may be associated with (or available in) the geo-location, corresponding to which an emergency alert signal (e.g., the emergency alert signal 108A) may be received by the electronic device 102. For example, the geo-location corresponding to the electronic device 102 may be at a border area between two geo-graphical regions (e.g., two neighboring states of a country). In such case, the emergency alert signal 108A associated with both the states may be received by the electronic device 102. The user of the electronic device 102 may be interested in broadcast channels and emergency alert messages associated with the user's state. The disclosed electronic device 102 may determine the second broadcast channel from the plurality of broadcast channels received by the electronic device 102, based on the determined geo-location. Based on the determination of the second broadcast channel from the plurality of broadcast channels, emergency alert messages associated with the geo-location of the user may be received by the electronic device 102. Example content rendering scenarios associated with the detection of the set of objects 306A, are described, for example, in FIGS. 4A, 4B, and 4C.

At 308, an emergency alert audio 308A may be detected. In an embodiment, the circuitry 202 may be configured to detect the emergency alert audio 308A in the received first media content 302A. The emergency alert audio 308A may correspond to a predetermined audio signal (e.g., an audio tone) that may be used to alert users (for example, viewers of the electronic device 102) of an upcoming alert message related to an emergency. In an example, the emergency alert audio 308A may correspond to a two-tone attention signal of 853 Hz and 960 HZ sine wave. In another example, the emergency alert audio 308A may correspond to a 1050 Hz audio signal. In another embodiment, the emergency alert audio 308A may correspond to the set of audio samples (i.e., dialogue or speech) related to the emergency, At 310, an emergency alert message 310A may be extracted. In an embodiment, the circuitry 202 may be configured to extract the emergency alert message received over the second broadcast channel (i.e., associated with the geo-location) based on the detected set of objects 306A and the detected emergency alert audio 308A. The emergency alert message 310A may include at least one of audio content, video content, or text content. For example, the emergency alert message 310A may include a text such as, "Tornado warning in CA at 1300 hours tomorrow".

In an embodiment, the circuitry 202 may be configured to determine a discontinuity in the received first media content 302A based on the detected set of objects 306A. For example, the received first media content 302A may correspond to a soap opera or a theatre drama video. In case the set of objects 306A, (such as, a podium and an emblem of a country or a government agency) are detected from the received first media content 104A, the circuitry 202 may determine a discontinuity in the received first media content 302A or in current set of image frames, as the detected set of objects 306A may not correspond to the soap opera or the theatre drama video. In an embodiment, the circuitry 202 may use a machine learning model (e.g., the ML model 212) to determine the discontinuity in the received first media content 302A based on the detected set of objects 306A or based on context mismatch between the first media content 104A and the set of objects 306A. For context matching, the circuitry 202 may compare different information related to the first media content 302A (like related to title, lyrics, dialogue, actors, genre, and the like) with the detected set of objects 306A corresponding to the emergency. In case of significant mismatch between the context of the first media content 302A and the detected set of objects 306A, the circuitry 202 may determine that the first media content 302A (i.e., received over the first broadcast channel) is being discontinued by the set of objects 306A being included in the first media content 302A as received from the first AV server 104.

In an embodiment, the circuitry 202 may be configured to apply a machine learning model (e.g., the ML model 212) on the set of audio samples related to the emergency alert audio 308A in the received first media content 302A. Further, the circuitry 202 may determine the discontinuity in the received first media content 302A based on the application of the ML model 212 on the set of audio samples. For example, the ML model 212 may be include an audio-to-text converter model and/or a natural language processing (NLP) model. The ML model 212 may be configured to convert, by use of the audio-to-text converter model, the set of audio samples to corresponding textual information and further determine, by use of the NLP model, one or more contexts associated with the corresponding text information. Based on determined one or more contexts, the ML model 212 may determine a discontinuity of context between a first portion of text and a second portion of text in the textual information. Based on the determined discontinuity of context, the circuitry 202 may be configured to determine the discontinuity in the received first media content 302A using the set of audio samples related to the emergency alert audio 308A. For example, the first media content 302A may be related to a sports event and an initial textual context of the first media content 302A may be related to a commentary of sports journalist who may analyze the progression of the game. A discontinuity may be detected, for example, when a textual context of the first media content 302A changes to a weather alert in the midst of the sports commentary. As the textual context of sports commentary may be different from a weather alert, the circuitry 202 may indicate the change in textual context as the discontinuity of context.

In an embodiment, the extraction of the emergency alert message 310A may be further based on the determined discontinuity. For example, based on the determined discontinuity, the circuitry 202 may further tune the electronic device 102 to the second broadcast channel associated with the geo-location. In other words, the circuitry 202 may switch the reception of signals/content from the first broadcast channel to the second broadcast channel (i.e., that may be including the emergency alert message). The circuitry 202 may further extract the emergency alert message 310A received over the second broadcast channel. In some embodiments, the emergency alert message 310A may be directly extracted from the first media content 302A. In such case, the switch between the first broadcast channel to the second broadcast channel may not be required while rendering the second media content 304A received from the second AV server 106 (i.e., non-broadcast source) or from the memory 204.

In an embodiment, the circuitry 202 may be configured to determine a static display portion in the received first media content 302A based on the detected set of objects 306A. For example, the first media content 302A may be a sports event (such as, a soccer match as shown, for example, in FIG. 3A) and the detected set of objects 306A may be enclosed inside a window (as shown in FIGS. 3A and 4A-4C) that may be included in one or more image frames of the first media content 302A, wherein the set of objects 306A may include (but not limited to) an emblem of a state or a country, a podium, and a head of the state or country, or a symbol/image related to the emergency. In such case, the window (including the set of objects 306A) inside the received first media content 302A of the sports event (such as, a soccer match) may be a static display portion. A rate of change of pixel location of such objects in the static display portion (e.g., the window of the set of objects 306A) across image frames of the first media content 302A may be less than a certain threshold value (e.g., a rate of change of a certain number of pixels per frame). In an example, the circuitry 202 may apply a machine learning model (e.g., the ML model 212) on the received first media content 302A to determine the static display portion in the received first media content 302A. The ML model 212 may be trained on a set of frames of one or more videos including static and non-static portions. In an embodiment, the extraction of the emergency alert message 310A may be further based on the determined static display portion. For example, based on the determined static portion, the circuitry 202 may tune the electronic device 102 to the second broadcast channel associated with the geo-location and further extract the emergency alert message 310A received over the second broadcast channel.

At 312, the emergency alert signal 108A may be output. In an embodiment, the circuitry 202 may be configured to control the display device 112 to output the emergency alert signal 108A associated with the extracted emergency alert message 310A. In an embodiment, media content associated with the emergency alert signal 108A may include at least one of audio content, video content, or text content. The emergency alert signal 108A may correspond to warning alerts for public that may be broadcasted via the second broadcast channel (for example, a broadcast television channel, a satellite television, a radio broadcast station, and a cable television channel). For example, authorized officials associated with national or local authorities may publicize the warning alerts associated with emergencies. Such emergencies may include, and may not limited to, civil emergencies, weather alerts, or any other emergency alerts. For example, the emergencies may include, but are not limited to, natural calamities, pandemic diseases, law-and-order issues, or war.

In an embodiment, the circuitry 202 may be configured to control the display device 112 to render, in a single-view mode, the emergency alert signal 108A that may be associated with the emergency alert message 310A received from the second broadcast channel. The render of the emergency alert signal 108A in the single-view mode is described further, for example, in FIG. 5A. In an embodiment, the circuitry 202 may be configured to control the electronic device 102 to switch from the first broadcast channel to the second broadcast channel, for the extraction of the emergency alert message 310A. In an embodiment, the circuitry 202 may be configured to render the emergency alert signal 108A (i.e., extracted from the second broadcast channel) along with the second media content 304A in a composite-view mode. In an embodiment, in the composite-view mode, the circuitry 202 may be further configured to output audio content associated with the emergency alert signal 108A (i.e., extracted from the second broadcast channel) and concurrently output video content associated with the second media content 304A. In another embodiment, in the composite view-mode, the circuitry 202 may be further configured to output at least one of text content or video content associated with the emergency alert signal 108A (i.e., extracted from the second broadcast channel) and concurrently output audio content associated with the second media content 304A. The output of the emergency alert signal 108A in the composite-view mode is described further, for example, in FIGS. 5B and 5C. The concurrent output of the emergency alert signal 108A and the second media content 304A by the disclosed electronic device 102 may ensure that the viewer may not miss the important emergency alert message 310A while watching the second media content 304A (i.e., like OTT content received over non-broadcasting channel) and may also have continuous experience of the second media content 304A (at least in a video or audio form). Further, a combination of image frame analysis (for the detection of set of objects 306A) and audio sample analysis (for the determination of the textual context) may be performed from the broadcast content (i.e., the first media content 302A) by the disclosed electronic device 102. Hence, the detection of emergency notifications (and discontinuities) may be more accurate compared to detection based on one of the set of objects 306A or the set of audio samples in the first media content 302A.

In an embodiment, the circuitry 202 may be configured to monitor the second broadcast channel to detect the emergency alert audio 308A (or the emergency alert message 310A), based on the electronic device 102 being in an idle mode (or in sleep or standby mode). The circuitry 202 may be further configured to control the output of the emergency alert signal 108A associated with the extracted emergency alert message 310A based on the monitored second broadcast channel. For example, in case the electronic device 102 is in a standby mode, or if the electronic device 102 is not tuned to any other broadcast channel (like the first broadcast channel or the second broadcast channel), then the circuitry 202 may be configured to monitor the second broadcast channel continuously for the emergency alert signal 108A. Based on the extraction of the emergency alert signal 108A, the electronic device 102 may automatically switch to the second broadcast channel and output the emergency alert signal 108A associated with the emergency alert message 310A.

It should be noted that the first media content 302A, the second media content 304A, and the set of objects 306A shown in FIG. 3A are for exemplary purposes and should not be construed to limit the scope of the disclosure.

Figure 4A:
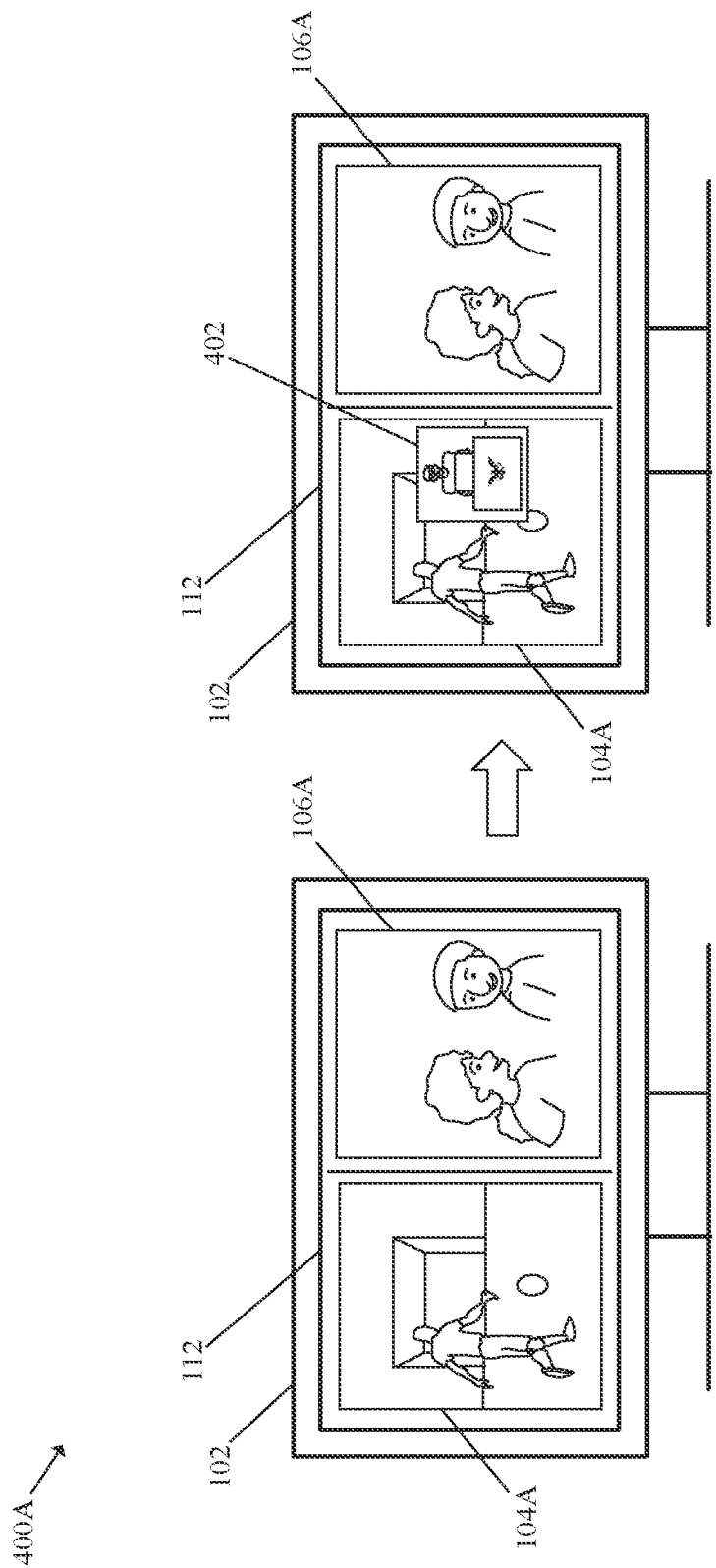
FIGS. 4A, 4B, and 4C are diagrams that illustrate exemplary scenarios to detect a set of objects, in accordance with an embodiment of the disclosure.
Figure 4B:
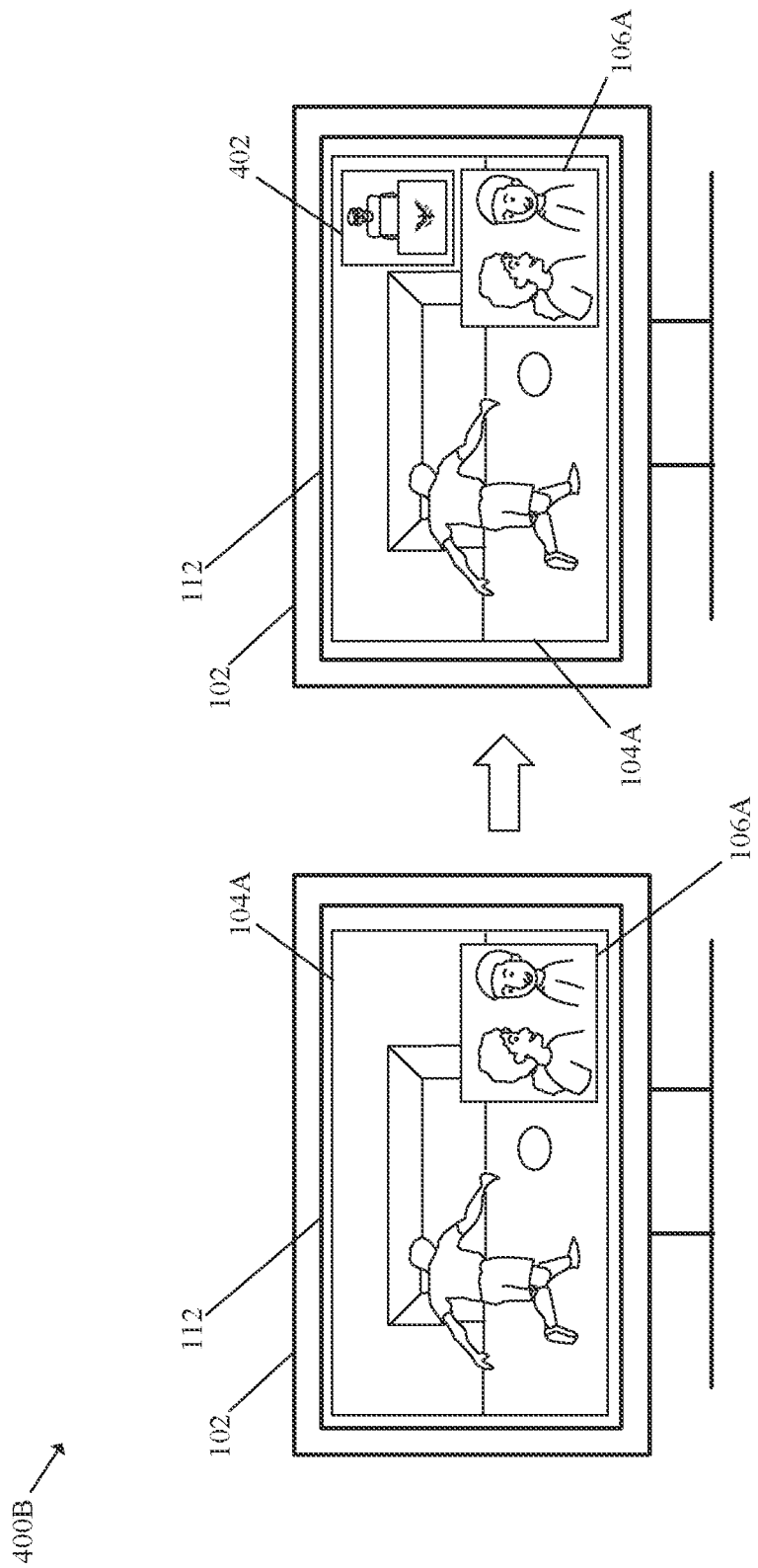
Figure 4C:
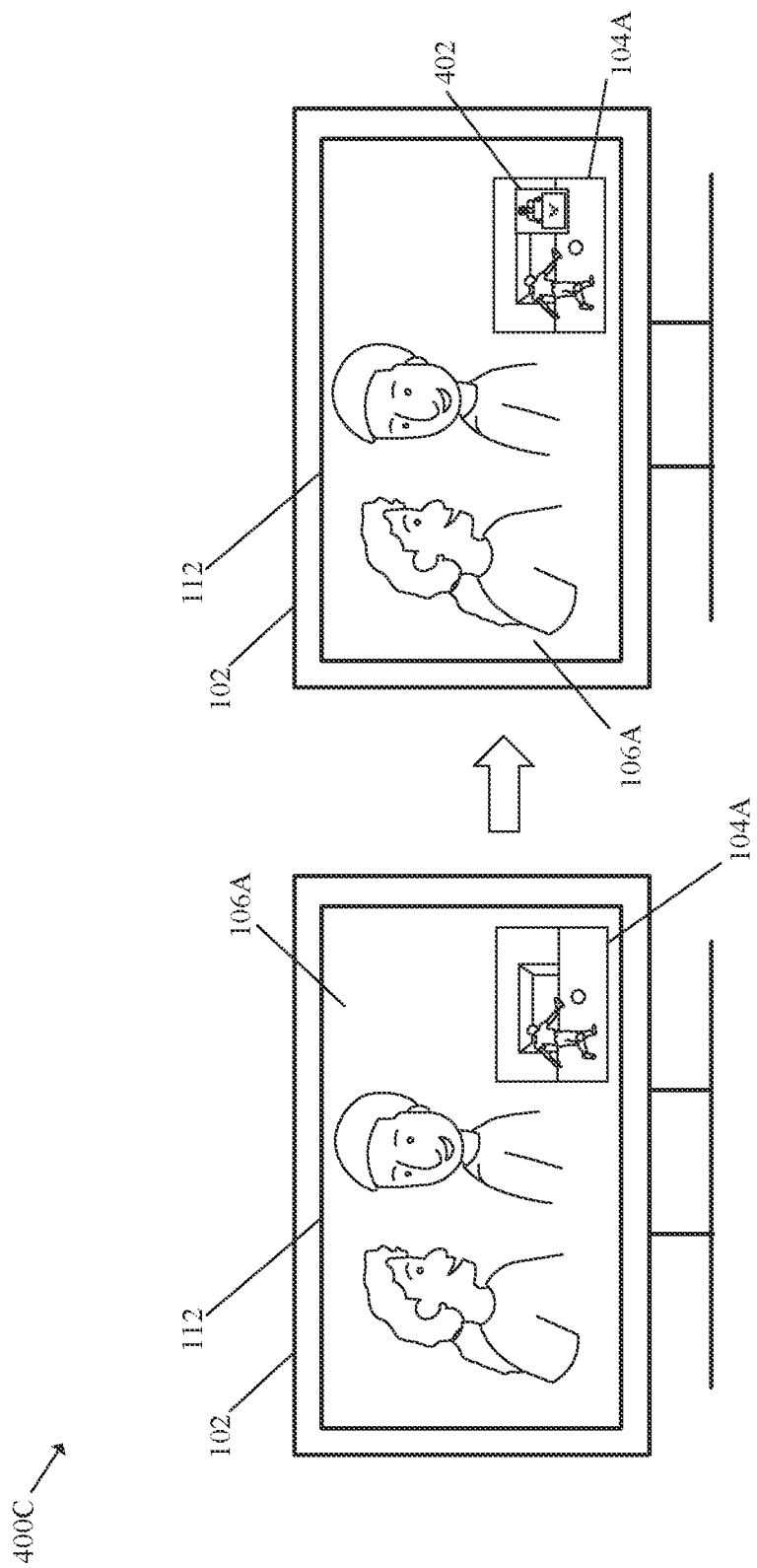

FIGS. 4A, 4B, and 4C are diagrams that illustrate exemplary scenarios to detect a set of objects, in accordance with an embodiment of the disclosure. FIGS. 4A, 4B, and 4C are described in conjunction with elements from FIGS. 1, 2, 3A, and 3B. With reference to FIG. 4A, there is shown an exemplary scenario 400A. The exemplary scenario 400A may include the electronic device 102. There is shown the first media content 104A and the second media content 106A rendered in a composite-view mode on the display device 112 associated with the electronic device 102. As an example, the first media content 104A may correspond to TV broadcast content, and the second media content 106A may correspond to OTT media content. As shown in FIG. 4A, in the composite-view mode, the first media content 104A and the second media content 106A may be rendered concurrently (for example, in a side-by-side configuration) on the display device 112. In an embodiment, in the composite-view mode, the electronic device 102 may output audio content of one of the first media content 104A or the second media content 106A and video content of both the first media content 104A and the second media content 106A. For example, in the composite-view mode, the electronic device 102 may enable the user to watch and listen to one show (e.g., an OTT drama show) and concurrently watch another show (e.g., a soccer game broadcast on a TV channel).

With reference to FIG. 4B, there is shown an exemplary scenario 400B. The exemplary scenario 400B may include the electronic device 102. There is shown the first media content 104A and the second media content 106A rendered in the composite-view mode on the display device 112 associated with the electronic device 102. As an example, the first media content 104A may correspond to TV broadcast content, and the second media content 106A may correspond to OTT media content. As shown in FIG. 4B, in the composite-view mode, the first media content 104A and the second media content 106A may be rendered concurrently (for example, in a picture-in-picture configuration) on the display device 112. In an embodiment, in the composite-view mode, the electronic device 102 may output audio content of one of the first media content 104A or the second media content 106A and video content of both the first media content 104A and the second media content 106A. For example, in the picture-in-picture configuration, the first media content 104A may be rendered as primary video content (for example, in a larger window) on the display device 112 and concurrently the second media content 106A may be rendered as secondary video content (for example, as a smaller window).

With reference to FIG. 4C, there is shown an exemplary scenario 400C. The exemplary scenario 400C may include the electronic device 102. There is shown the first media content 104A and the second media content 106A rendered in the composite-view mode on the display device 112 associated with the electronic device 102. As an example, the first media content 104A may correspond to TV broadcast content, and the second media content 106A may correspond to OTT media content. As shown in FIG. 4C, in the composite-view mode, the first media content 104A and the second media content 106A may be rendered concurrently (for example, in a picture-in-picture configuration) on the display device 112. For example, in the picture-in-picture configuration shown in FIG. 4C, the first media content 104A may be rendered as secondary video content (for example, in a smaller window) on the display device 112 and concurrently the second media content 106A may be rendered as primary video content (for example, as a larger window).

In an embodiment, the circuitry 202 may be configured to detect, from the first media content 104A, the set of objects 306A associated with the geo-location associated with the electronic device 102. Herein the set of objects 306A may correspond to an emergency at the geo-location as described, for example, in FIGS. 3A-3B. For example, the circuitry 202 may detect a box 402 (or a window) inside or overlaid on video content of the first media content 104A. The box 402 may include the set of objects 306A such as, for example, an emblem of a state or country, a podium, a head of the state or country, and/or any object related to an emergency situation. The set of objects 306A may also include a ticker text (not shown) that may move from a first direction (e.g., a left direction inside the box 402) to a second direction (e.g., a right direction inside the box 402). The ticker text may include, for example, a warning or alert text associated with the emergency alert message 310A. In an embodiment, the box 402 may be a static display portion in the first media content 104A. In another embodiment, the box 402 may correspond to a discontinuity in the first media content 104A as described, for example, in FIG. 3B. The extraction of the emergency alert message 310A may be based on the detection of the box 402 and/or the discontinuity in the first media content 104A. The detection of the set of objects from the first media content 104A is described, for example, in FIG. 3A.

Figure 5A:
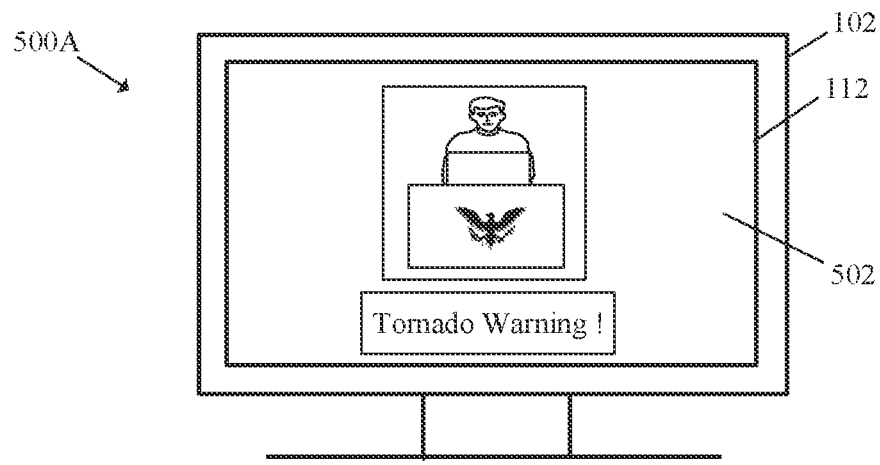
FIGS. 5A, 5B, and 5C are diagrams that illustrate exemplary scenarios to output an emergency alert signal, in accordance with an embodiment of the disclosure.
Figure 5B:
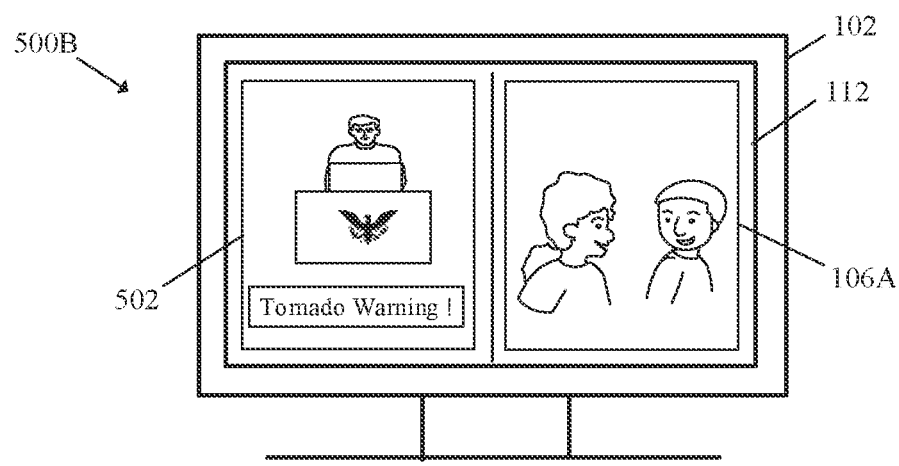
Figure 5C:
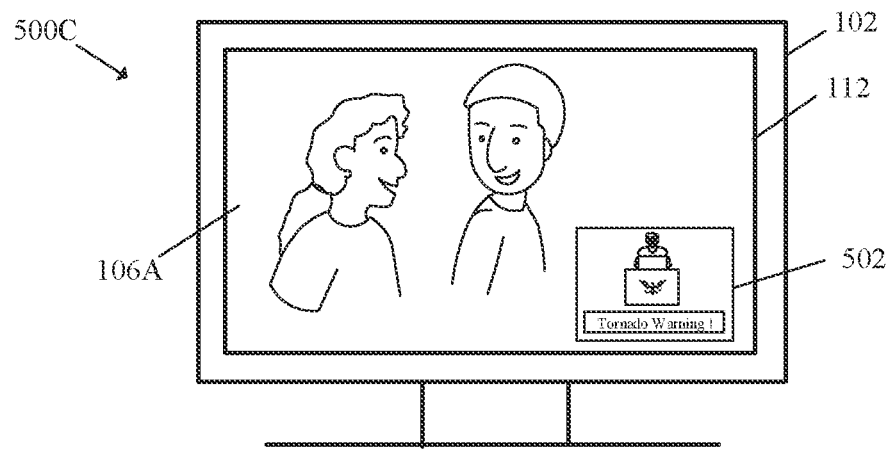

FIGS. 5A, 5B, and 5C are diagrams that illustrate exemplary scenarios to output an emergency alert signal, in accordance with an embodiment of the disclosure. FIGS. 5A, 5B, and 5C are described in conjunction with elements from FIGS. 1, 2, 3A, 3B, 4A, 4B, and 4C. With reference to FIG. 5A, there is shown an exemplary scenario 500A. The exemplary scenario 500A may include the electronic device 102 that may include the display device 112 and a speaker (not shown). In an embodiment, the circuitry 202 may be configured to extract the emergency alert message 310A received over the second broadcast channel associated with the geo-location of the electronic device 102. Herein, the extraction of the emergency alert message 310A may be based on the detected set of objects 306A and the detected emergency alert audio 308A in the received first media content 104A. The extraction of the emergency alert message 310A is described further, for example, in FIGS. 3A and 3B. In an embodiment, the circuitry 202 may be configured to control the display device 112 to render, in a single-view mode, the emergency alert signal 108A that may be associated with the emergency alert message 310A received from the second broadcast channel. For example, audio content of the emergency alert signal 108A associated with an emergency alert message 502 may be output through the speaker associated with the electronic device 102. Further, video content or text content of the emergency alert signal 108A associated with the emergency alert message 502 may be displayed on the display device 112 associated with the electronic device 102. As shown in FIG. 5A, the emergency alert message 502 may correspond to a "Tornado Warning".

With reference to FIGS. 5B and 5C, there are shown exemplary scenarios 500B and 500C. The exemplary scenarios 500B and 500C may include the electronic device 102 that may include the display device 112 and a speaker (not shown). In an embodiment, the circuitry 202 may be configured to control the electronic device 102 to switch from the first broadcast channel to the second broadcast channel, for the extraction of the emergency alert message 502. The circuitry 202 may be configured to render the emergency alert signal 108A from the second broadcast channel along with the second media content 106A in a composite-view mode. For example, as shown in FIG. 5B, in the composite-view mode, the emergency alert signal 108A and the second media content 106A may be rendered concurrently in a side-by-side configuration on the display device 112. In another example, as shown in FIG. 5C, in the composite-view mode, the emergency alert signal 108A and the second media content 106A may be rendered concurrently in a picture-in-picture configuration on the display device 112.

In an embodiment, in the composite-view mode, the circuitry 202 may be further configured to output audio content (i.e., like warning audio message) associated with the emergency alert signal 108A and concurrently output video content associated with the second media content 106A. In another embodiment, in the composite view-mode, the circuitry 202 may be further configured to output at least one of text content or video content (i.e., warning text or video message) associated with the emergency alert signal 108A and concurrently output audio content associated with the second media content 106A. The concurrent output of the emergency alert signal 108A and the second media content 106A by the disclosed electronic device 102 may ensure that the viewer may not miss the important emergency alert message 502 while watching the second media content 106A (i.e., like OTT content received over non-broadcasting channel) and may also have continuous experience of the second media content 106A (at least in a video or audio form)

Typically, emergency alert messages may be communicated over pre-determined broadcast channels and may be detected at service provider devices. On detection of an emergency alert message, the service provider device may switch a broadcast channel (i.e., that may be currently tuned on a television device) with the pre-determined broadcast channel associated with the emergency alert message. Once the television device is tuned to the pre-determined broadcast channel associated with the emergency alert message, the television device may render the emergency alert message. However, the switch to the pre-determined broadcast channel based on the detection of the emergency alert message at the service provider device may be abrupt and may impact a viewing experience of a viewer of the television device. In many cases, the emergency alert message may not be relevant to the viewer, and viewer may choose to ignore the emergency alert message. For example, the emergency alert message may be related to a geo-location that may not be associated with the viewer and/or the television device. In such cases, the switch to the pre-determined broadcast channel may be unnecessary. Further, in case the television device is not tuned to any broadcast channel and renders non-broadcast content (such as, streaming content, OTT content, or content stored on a local media storage device), the television device may be unable to receive the emergency alert message (i.e., related to an emergency) from the service provider device, which may further impact the viewer.

In contrast, the disclosed electronic device 102 may extract the emergency alert message from an emergency broadcast channel (or from the received first media content 104A) based on the set of objects (e.g., an individual, a podium, a desk, a flag, an emblem, or any visual object related to the emergency) automatically detected from another broadcast channel, at the time a viewer of the electronic device 102 may be watching or listening to content related to the non-broadcast content (for example an OTT content). The set of objects may be associated with the geo-location (e.g., a location where the viewer resides) associated with the electronic device 102. The set of objects may correspond to an emergency (e.g., a natural calamity, a disease (such as, a pandemic), or a war) at the geo-location. As the set of objects may be related to the emergency at the geo-location associated with the viewer, the emergency alert message extracted based on the detected set of objects may be relevant to the viewer. Further, the electronic device 102 may detect the set of audio samples (i.e., related emergency alert audio) in the received first media content 104A (in addition to the detection of the set of objects 306A) to accurately corroborate whether the detected set of objects correspond to the emergency or not. The disclosed electronic device 102 may extract the emergency alert message based on the automatic detection of set of objects and the detection of the emergency alert audio in the first media content, especially when the viewer may not be rendering content from the broadcast channel or rendering the non-broadcast content (for example the OTT content). Therefore, the disclosed electronic device 102 ensures that the viewer may not miss any important emergency alert message (i.e., received on the broadcast channel), even in a case when the non-broadcast content (like OTT content) is being rendered to the viewer.

The disclosed electronic device 102 may further output the extracted emergency alert message in a single-view mode in which the audio, video, and text content of the emergency alert message may be output. Alternatively, the electronic device 102 may output the extracted emergency alert message in a composite-view mode. In one scenario of the composite-view mode, the audio content of the emergency alert message may be output concurrently with the video content of the second media content 106A. In another scenario of the composite-view mode, the video content and/or the text content of the emergency alert message may be output concurrently with the audio content of the second media content 106A. Thus, the disclosed electronic device 102 may enable the viewer to view and listen to the emergency alert message attentively in the single view-mode in case the emergency alert message is important to him/her. Alternatively, the disclosed electronic device 102 may enable the viewer to listen to the audio of the emergency alert message and continue to watch the second media content 106A or watch/read the emergency alert message and continue to listen to the second media content 106A. Herein, the emergency alert message may be delivered to the viewer and further consumed by the viewer in the background while the viewer continues to consume the second media content 106A. Thus, by the disclosed electronic device 102, the experience of the viewer may be enhanced as the viewer may not be disturbed by the abrupt channel switch on the detection of the emergency alert message.

Figure 6:
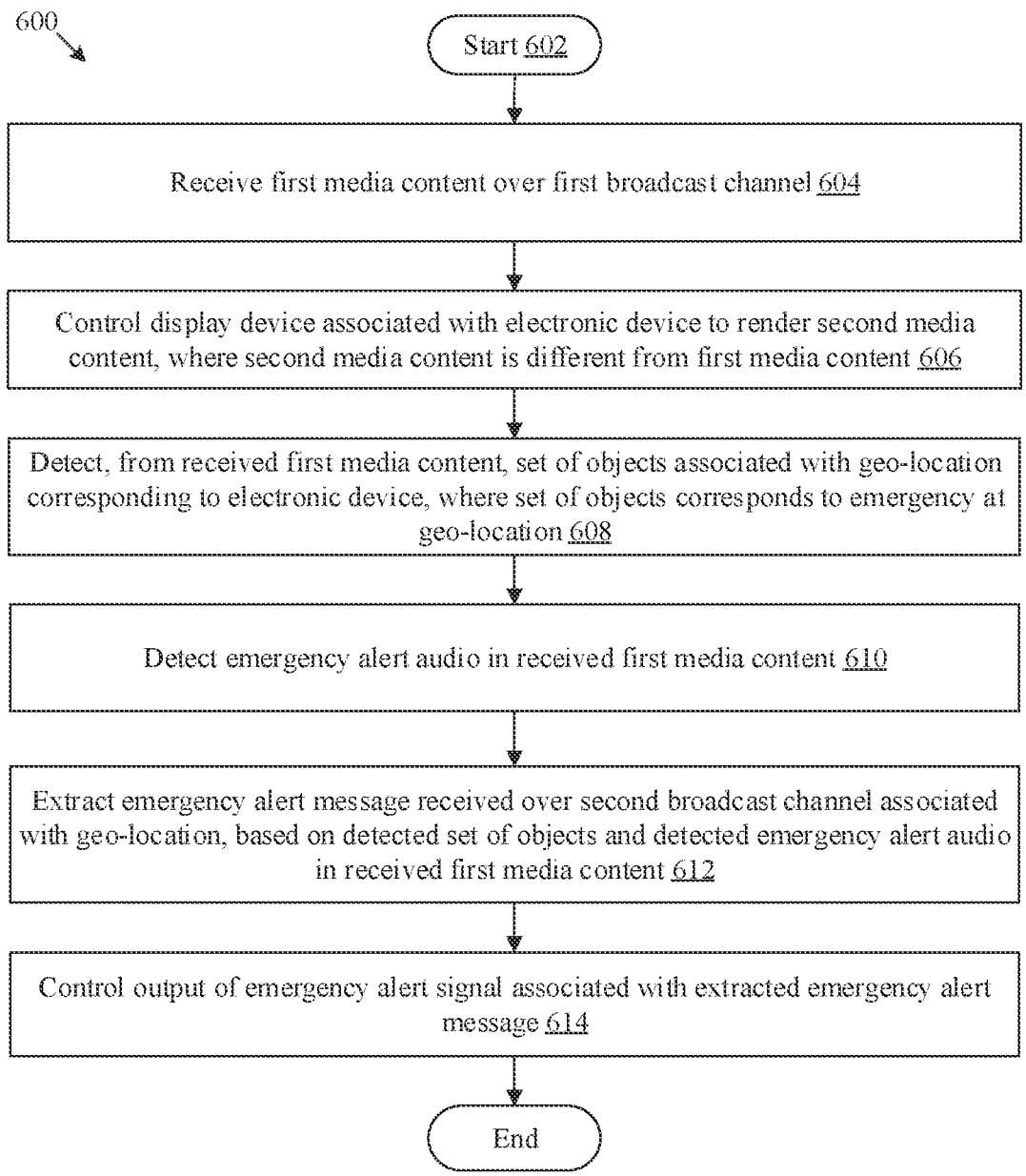
FIG. 6 is a flowchart that illustrates exemplary operations for emergency alert message detection on an electronic device based on audio-video information, in accordance with an embodiment of the disclosure.

FIG. 6 is a flowchart that illustrates exemplary operations for emergency alert message detection on an electronic device based on audio-video information, in accordance with an embodiment of the disclosure. FIG. 6 is described in conjunction with elements from FIGS. 1, 2, 3A, 3B, 4A, 4B, 4C, 5A, 5B, and 5C. With reference to FIG. 6, there is shown a flowchart 600. The flowchart 600 may include operations from 602 to 614 and may be implemented by the electronic device 102 of FIG. 1 or by the circuitry 202 of FIG. 2. The flowchart 600 may start at 602 and proceed to 604.

At 604, the first media content 104A may be received over the first broadcast channel. In an embodiment, the circuitry 202 may be configured receive the first media content 104A over the first broadcast channel, as described, for example, at 302 in FIG. 3A.

At 606, the display device 112 associated with the electronic device 102 may be controlled to render the second media content 106A where the second media content 106A may be different from the first media content 104A. In an embodiment, the circuitry 202 may be configured to control the display device 112 associated with the electronic device 102 to render the second media content 106A, is described, for example, at 304 in FIG. 3A.

At 608, the set of objects associated with the geo-location corresponding to the electronic device 102 may be detected from the received first media content 104A. Herein, the set of objects may correspond to an emergency at the geo-location. In an embodiment, the circuitry 202 may be configured to detect, from the rendered first media content 104A, the set of objects 306A associated with the geo-location corresponding to the electronic device 102. The detection of the set of objects 306A is described is described, for example, at 306, in FIG. 3A.

At 610, the emergency alert audio may be detected in the received first media content 104A. In an embodiment, the circuitry 202 may be configured to detect the emergency alert audio in the set of audio samples of the received first media content 104A. The detection of the emergency alert audio is described, for example, at 308, in FIG. 3B.

At 612, the emergency alert message received over the second broadcast channel (i.e., associated with the geo-location) may be extracted based on the detected set of objects and the detected emergency alert audio. In an embodiment, the circuitry 202 may be configured to extract the emergency alert message received over the second broadcast channel associated with the geo-location, based on the detected set of objects and the detected emergency alert tone. The extraction of the emergency alert message is described, for example, in FIGS. 3B, 4A, 4B, and 4C.

At 614, the output of the emergency alert signal 108A associated with the extracted emergency alert message may be controlled. In an embodiment, the circuitry 202 may be configured to control the output of the emergency alert signal 108A associated with the extracted emergency alert message, as described, for example, in FIGS. 3B, 5A, 5B, and 5C. Control may pass to end.

Although the flowchart 600 is illustrated as discrete operations, such as 604, 606, 608, 610, 612, and 614, the disclosure is not so limited. Accordingly, in certain embodiments, such discrete operations may be further divided into additional operations, combined into fewer operations, or eliminated, depending on the implementation without detracting from the essence of the disclosed embodiments.

Various embodiments of the disclosure may provide a non-transitory computer-readable medium and/or storage medium having stored thereon, computer-executable instructions executable by a machine and/or a computer to operate an electronic device (for example, the electronic device 102). Such instructions may cause the electronic device 102 to perform operations that include reception of first media content (such as the first media content 104A) received over the first broadcast channel. The operations may further include control of a display device (such as the display device 112) associated with the electronic device 102 to render second media content (such as the second media content 106A). Herein, the second media content 106A may be different from the first media content 104A. The operations may further include detection, from the received first media content 104A, of a set of objects (such as the set of objects 306A) associated with the geo-location corresponding to the electronic device 102. The operations may further include detection of an emergency alert tone in the received first media content 104A. The operations may further include extraction of the emergency alert message received over a second broadcast channel associated with the geo-location, based on the detected set of objects and the detected emergency alert audio. The operations may further include control of an output of an emergency alert signal (such as the emergency alert signal 108A) associated with the extracted emergency alert message.

Exemplary aspects of the disclosure may provide an electronic device (such as, the electronic device 102 of FIG. 1) that may include circuitry (such as, the circuitry 202). The circuitry 202 may be configured to receive a first media content (such as, the first media content 104A) received over the first broadcast channel. The circuitry 202 may be further configured to control a display device (such as, the display device 112) to render second media content (such as, the second media content 106A). The second media content 106A may be different from the first media content 104A. The circuitry 202 may be further configured to detect, from the received first media content 104A, a set of objects associated with a geo-location corresponding to the electronic device 102. The set of objects may correspond to an emergency at the geo-location. The circuitry 202 may be further configured to detect an emergency alert audio in the received first media content 104A. The circuitry 202 may be further configured to extract the emergency alert message received over a second broadcast channel associated with the geo-location, based on the detected set of objects and the detected emergency alert audio. The circuitry 202 may be further configured to control the output of an emergency alert signal (e.g., the emergency alert signal 108A) associated with the extracted emergency alert message.

In an embodiment, the circuitry 202 may be configured to determine a discontinuity in the received first media content 104A based on the detected set of objects. The extraction of the emergency alert message may be further based on the determined discontinuity.

In an embodiment, the circuitry 202 may be configured to determine a static display portion in the received first media content 104A based on the detected set of objects. The extraction of the emergency alert message may be further based on the determined static display portion.

In an embodiment, the circuitry 202 may be configured to apply a machine learning model (e.g., the ML model 212) on a set of audio samples related to the emergency alert audio in the received first media content 104A. Further, the circuitry 202 may be configured to determine a discontinuity in the received first media content 104A based on the application of the machine learning model (e.g., the ML model 212) on the set of audio samples. Herein, the extraction of the emergency alert message may be further based on the determined discontinuity.

In an embodiment, the circuitry 202 may be configured to control the display device 112 to render, in a single-view mode, the emergency alert signal 108A that may be associated with the emergency alert message received from the second broadcast channel.

In an embodiment, the circuitry 202 may be configured to control the electronic device 102 to switch from the first broadcast channel to the second broadcast channel, for the extraction of the emergency alert message. The circuitry 202 may be further configured to control the display device 112 to render the emergency alert signal from the second broadcast channel along with the second media content in a composite-view mode. In an embodiment, in the composite-view mode, the circuitry may be further configured to output audio content associated with the emergency alert signal from the second broadcast channel and concurrently output video content associated with the second media content. In another embodiment, in the composite-view mode, the circuitry may be further configured to output at least one of text content or video content associated with the emergency alert signal from the second broadcast channel and concurrently output audio content associated with the second media content.

In an embodiment, the first media content 104A may correspond to an over-the-air (OTA) media content, a television (TV) broadcast content, a satellite TV content, or a cable TV content. In an embodiment, the second media content 106A may correspond to one of an over-the-top (OTT) media content, streaming media content, media content stored on the electronic device 102, or media content received from an Internet.

In an embodiment, the circuitry 202 may be configured to apply a machine learning model (e.g., the ML model 212) on a set of image frames in the received first media content 104A. Herein, the machine learning model (e.g., the ML model 212) may be trained to detect the set of objects, related to the emergency, from the first media content 104A. The circuitry 202 may be further configured to detect the set of objects from the received first media content 104A based on the application of the machine learning model (e.g., the ML model 212) on the set of image frames in the received first media content 104A.

In an embodiment, the circuitry 02 may be configured to apply a machine learning model (e.g., the ML model 212) on a set of audio samples in the received first media content 104A to determine textual content related to the set of audio samples. Herein, the machine learning model (e.g., the ML model 212) may be trained to convert audio samples to corresponding textual information. The circuitry 202 may be further configured to determine a context associated with the determined textual content based on the geo-location associated with the electronic device 102. The circuitry 202 may be configured to detect the set of objects from the received first media content further based on the determined context.

In an embodiment, the circuitry 202 may be further configured to determine the geo-location corresponding to the electronic device 102 based on at least one of a user input or a location sensor associated with the electronic device 102. The circuitry 202 may be further configured to determine, based on the determined geo-location, the second broadcast channel from a plurality of broadcast channels received by the electronic device 102.

In an embodiment, the circuitry 202 may be further configured to monitor the second broadcast channel to detect the emergency alert audio, based on the electronic device 102 being in an idle mode. The circuitry 202 may be configured to control an output of the emergency alert signal associated with the detected emergency alert message based on the monitored second broadcast channel.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the embodiment disclosed, but that the present disclosure will include all embodiments that fall within the scope of the appended claims.

What is claimed is:

1. An electronic device, comprising:
    circuitry configured to:
        receive first media content over a first broadcast channel;
        control a display device associated with the electronic device to render second media content, wherein the second media content is different from the first media content;
        detect, from the received first media content, a set of objects associated with a geo-location corresponding to the electronic device, wherein the set of objects corresponds to an emergency at the geo-location;
        detect an emergency alert audio in the received first media content;
        determine a static display portion in at least one image frame of the received first media content based on the detected set of objects, wherein the static display portion corresponds to a portion of the at least one image frame in which a rate of change of pixel location of the detected set of objects is less than a threshold value;
        extract an emergency alert message received over a second broadcast channel associated with the geo-location, based on the detected set of objects, the determined static display portion, and the detected emergency alert audio in the received first media content; and
        control an output of an emergency alert signal associated with the extracted emergency alert message.

2. The electronic device according to claim 1, wherein the circuitry is further configured to:
    determine a discontinuity in the received first media content based on the detected set of objects, wherein the extraction of the emergency alert message is further based on the determined discontinuity.

3. The electronic device according to claim 1, wherein the circuitry is further configured to:
    apply a machine learning model on a set of audio samples related to the emergency alert audio in the received first media content; and
    determine a discontinuity in the received first media content based on an application of the machine learning model on the set of audio samples, wherein the extraction of the emergency alert message is further based on the determined discontinuity.

4. The electronic device according to claim 1, wherein the circuitry is further configured to control the display device to render, in a single-view mode, the emergency alert signal that is associated with the emergency alert message received from the second broadcast channel.

5. The electronic device according to claim 1, wherein the circuitry is further configured to:
    control the electronic device to switch from the first broadcast channel to the second broadcast channel, for the extraction of the emergency alert message; and
    control the display device to render the emergency alert signal from the second broadcast channel along with the second media content in a composite-view mode.

6. The electronic device according to claim 5, wherein in the composite-view mode, the circuitry is further configured to output audio content associated with the emergency alert signal from the second broadcast channel and concurrently output video content associated with the second media content.

7. The electronic device according to claim 5, wherein in the composite-view mode, the circuitry is further configured to output at least one of text content or video content associated with the emergency alert signal from the second broadcast channel and concurrently output audio content associated with the second media content.

8. The electronic device according to claim 1, wherein the first media content corresponds to at least one of over-the-air (OTA) media content, a television (TV) broadcast content, a satellite TV content, or a cable TV content.

9. The electronic device according to claim 1, wherein the second media content corresponds to at least one of over-the-top (OTT) media content, streaming media content, media content stored on the electronic device, or media content received from an Internet.

10. The electronic device according to claim 1, wherein the circuitry is further configured to:
    apply a machine learning model on a set of image frames in the received first media content, wherein the machine learning model is trained to detect the set of objects, related to the emergency, from the first media content; and
    detect the set of objects from the received first media content based on an application of the machine learning model on the set of image frames in the received first media content.

11. The electronic device according to claim 1, wherein the circuitry is further configured to:
    apply a machine learning model on a set of audio samples in the received first media content to determine textual content related to the set of audio samples, wherein the machine learning model is trained to convert audio samples to corresponding textual information;
    determine a context associated with the determined textual content based on the geo-location associated with the electronic device; and
    detect the set of objects from the received first media content further based on the determined context.

12. The electronic device according to claim 1, wherein the circuitry is further configured to:
    determine the geo-location corresponding to the electronic device based on at least one of a user input or a location sensor associated with the electronic device; and determine, based on the determined geo-location, the second broadcast channel from a plurality of broadcast channels received by the electronic device.

13. The electronic device according to claim 1, wherein the circuitry is further configured to:
monitor the second broadcast channel to detect the emergency alert audio, based on the electronic device being in an idle mode; and
control the output of the emergency alert signal associated with the extracted emergency alert message based on the monitored second broadcast channel.

14. A method, comprising:
in an electronic device:
receiving first media content over a first broadcast channel;
controlling a display device associated with the electronic device to render second media content, wherein the second media content is different from the first media content;
detecting, from the received first media content, a set of objects associated with a geo-location corresponding to the electronic device, wherein the set of objects correspond to an emergency at the geo-location;
detecting an emergency alert audio in the received first media content;
determining a static display portion in at least one image frame of the received first media content based on the detected set of objects, wherein the static display portion corresponds to a portion of the at least one image frame in which a rate of change of pixel location of the detected set of objects is less than a threshold value;
extracting an emergency alert message received over a second broadcast channel associated with the geo-location, based on the detected set of objects, and the determined static display portion, and the detected emergency alert audio in the received first media content; and
controlling an output of an emergency alert signal associated with the extracted emergency alert message.

15. The method according to claim 14, further comprising controlling the display device, in a single-view mode, to render the emergency alert signal that is associated with the emergency alert message received from the second broadcast channel.

16. The method according to claim 14, further comprising:
controlling the electronic device to switch from the first broadcast channel to the second broadcast channel, for the extraction of the emergency alert message; and
controlling the display device to render the emergency alert signal from the second broadcast channel along with the second media content in a composite-view mode.

17. The method according to claim 16, in the composite-view mode, further comprising:
controlling an output of audio content associated with the emergency alert signal from the second broadcast channel; and
concurrently controlling an output of video content associated with the second media content.

18. The method according to claim 16, in the composite-view mode, further comprising:
controlling an output of at least one of text content or video content associated with the emergency alert signal from the second broadcast channel; and
concurrently controlling an output of audio content associated with the second media content.

19. A non-transitory computer-readable medium having stored thereon, computer-executable instructions that when executed by an electronic device, causes the electronic device to execute operations, the operations comprising:
receiving first media content over a first broadcast channel;
controlling a display device associated with the electronic device to render second media content, wherein the second media content is different from the first media content;
detecting, from the received first media content, a set of objects associated with a geo-location corresponding to the electronic device, wherein the set of objects correspond to an emergency at the geo-location;
detecting an emergency alert audio in the received first media content;
determining a static display portion in at least one image frame of the received first media content based on the detected set of objects, wherein the static display portion corresponds to a portion of the at least one image frame in which a rate of change of pixel location of the detected set of objects is less than a threshold value;
extracting an emergency alert message received over a second broadcast channel associated with the geo-location, based on the detected set of objects, and the determined static display portion, and the detected emergency alert audio in the received first media content; and
controlling an output of an emergency alert signal associated with the extracted emergency alert message.

* * * * *